United States Patent
Hoover et al.

(10) Patent No.: US 8,018,466 B2
(45) Date of Patent: Sep. 13, 2011

(54) GRAPHICS RENDERING ON A NETWORK ON CHIP

(75) Inventors: Russell D. Hoover, Rochester, MN (US); Jamie R. Kuesel, Rochester, MN (US); Eric O. Mejdrich, Rochester, MN (US); Paul E. Schardt, Rochester, MN (US); Robert A. Shearer, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 880 days.

(21) Appl. No.: 12/029,647

(22) Filed: Feb. 12, 2008

(65) Prior Publication Data

US 2009/0201302 A1 Aug. 13, 2009

(51) Int. Cl.
G09G 5/00 (2006.01)
G06F 15/16 (2006.01)
G06F 13/14 (2006.01)

(52) U.S. Cl. .................. 345/581; 345/502; 345/519
(58) Field of Classification Search .................. 345/581, 345/582, 502, 519
See application file for complete search history.

(56) References Cited

U.S. PATENT DOCUMENTS

| | | |
|---|---|---|
| 4,813,037 A | 3/1989 | Debuysscher et al. |
| 5,590,308 A | 12/1996 | Shih |
| 5,761,516 A | 6/1998 | Rostoker et al. |
| 5,870,479 A | 2/1999 | Feiken et al. |
| 5,884,060 A | 3/1999 | Vegesna et al. |
| 5,974,487 A | 10/1999 | Hartmann |
| 6,047,122 A | 4/2000 | Spiller |
| 6,085,315 A | 7/2000 | Fleck et al. |
| 6,101,599 A | 8/2000 | Wright et al. |
| 6,145,072 A | 11/2000 | Shams et al. |
| 6,151,668 A | 11/2000 | Pechanek et al. |
| 6,292,888 B1 | 9/2001 | Nemirovsky et al. |
| 6,446,171 B1 | 9/2002 | Henriksen |
| 6,567,895 B2 | 5/2003 | Scales |
| 6,668,308 B2 | 12/2003 | Barroso et al. |
| 6,675,284 B1 | 1/2004 | Warren |
| 6,725,317 B1 | 4/2004 | Bouchier et al. |
| 6,823,429 B1 | 11/2004 | Olnowich |
| 6,891,828 B2 | 5/2005 | Ngai |
| 6,915,402 B2 | 7/2005 | Wilson et al. |
| 6,950,438 B1 | 9/2005 | Owen et al. |

(Continued)

FOREIGN PATENT DOCUMENTS

CN 1599471 3/2005

OTHER PUBLICATIONS

Office Action Dated Jan. 29, 2010 in U.S. Appl. No. 11/945,396.

(Continued)

Primary Examiner — Ryan R Yang
(74) Attorney, Agent, or Firm — Biggers & Ohanian, LLP

(57) ABSTRACT

Graphics rendering on a network on chip ('NOC') including receiving, in the geometry processor, a representation of an object to be rendered; converting, by the geometry processor, the representation of the object to two dimensional primitives; sending, by the geometry processor, the primitives to the plurality of scan converters; converting, by the scan converters, the primitives to fragments, each fragment comprising one or more portions of a pixel; for each fragment: selecting, by the scan converter for the fragment in dependence upon sorting rules, a pixel processor to process the fragment; sending, by the scan converter to the pixel processor, the fragment; and processing, by the pixel processor, the fragment to produce pixels for an image.

20 Claims, 9 Drawing Sheets

U.S. PATENT DOCUMENTS

| | | | |
|---|---|---|---|
| 6,973,032 | B1 | 12/2005 | Casley et al. |
| 6,988,149 | B2 | 1/2006 | Odenwald |
| 7,015,909 | B1 * | 3/2006 | Morgan, III et al. .......... 345/426 |
| 7,072,996 | B2 | 7/2006 | Adusumilli et al. |
| 7,162,560 | B2 | 1/2007 | Taylor et al. |
| 7,376,789 | B2 | 5/2008 | Halleck et al. |
| 7,394,288 | B1 | 7/2008 | Agarwal |
| 7,398,374 | B2 | 7/2008 | DeLano |
| 7,464,197 | B2 | 12/2008 | Ganapathy et al. |
| 7,493,474 | B1 | 2/2009 | Pechanek et al. |
| 7,500,060 | B1 | 3/2009 | Anderson et al. |
| 7,502,378 | B2 | 3/2009 | Lajolo et al. |
| 7,521,961 | B1 | 4/2009 | Anderson et al. |
| 7,533,154 | B1 | 5/2009 | Chen et al. |
| 7,546,444 | B1 | 6/2009 | Wolrich et al. |
| 7,568,064 | B2 | 7/2009 | Reblewski et al. |
| 7,590,774 | B2 | 9/2009 | Johns et al. |
| 7,689,738 | B1 | 3/2010 | Williams et al. |
| 2002/0099833 | A1 | 7/2002 | Steely et al. |
| 2002/0178337 | A1 | 11/2002 | Wilson et al. |
| 2003/0065890 | A1 | 4/2003 | Lyon |
| 2004/0083341 | A1 | 4/2004 | Robinson et al. |
| 2004/0088487 | A1 | 5/2004 | Barroso et al. |
| 2004/0151197 | A1 | 8/2004 | Hui |
| 2004/0250046 | A1 | 12/2004 | Gonzalez et al. |
| 2004/0260906 | A1 | 12/2004 | Landin et al. |
| 2005/0086435 | A1 | 4/2005 | Todoroki |
| 2005/0166205 | A1 | 7/2005 | Oskin et al. |
| 2005/0198442 | A1 | 9/2005 | Mandler |
| 2005/0203988 | A1 | 9/2005 | Nolle et al. |
| 2005/0238035 | A1 | 10/2005 | Riley |
| 2006/0209846 | A1 | 9/2006 | Clermidy et al. |
| 2006/0242393 | A1 | 10/2006 | Park et al. |
| 2007/0055826 | A1 | 3/2007 | Morton et al. |
| 2007/0076739 | A1 | 4/2007 | Manjeshwar et al. |
| 2008/0134191 | A1 | 6/2008 | Warrier et al. |
| 2008/0186998 | A1 | 8/2008 | Rijpkerna |
| 2009/0083263 | A1 | 3/2009 | Felch et al. |
| 2009/0282222 | A1 | 11/2009 | Hoover et al. |

OTHER PUBLICATIONS

Final Office Action Dated Jan. 15, 2010 in U.S. Appl. No. 12/031,733.
David Taylor, et al. "System on Chip Packet Processor for an Experimental Network Service Platform". 2003.
Office Action Dated Mar. 30, 2010 in U.S. Appl. No. 11/926,212.
Final Office Action Dated May 19, 2010 in U.S. Appl. No. 11/945,396.
Intel, E8870 Chipset, Intel, Jun. 2002, pp. 1-10.
Office Action Dated Apr. 2, 2010 in U.S. Appl. No. 11/955,553.
Kumar, et al. "A Network on Chip Architecture and Design Methodology". Published 2002, pp. 1-8, ISBN 0-7695-1486-03/02 by IEEE.
Bolotin, et al. "The Power of Priority: NoC based Distributed Cache Coherency". Published May 21, 2007, pp. 117-126, ISBN 0-7695-2773-06/07 by IEEE.
Office Action Dated Mar. 24, 2010 in U.S. Appl. No. 12/031,733.
Walter, et al., "BENoC: A Bus-Enhanced Network on-Chip". Dec. 2007, Technion, Israel Institute of Technology, Haifa, Israel.
Office Action Dated Jun. 8, 2010 in U.S. Appl. No. 12/118,298.
Office Action Dated May 26, 2010 in U.S. Appl. No. 12/117,875.
U.S. Appl. No. 12/117,897, filed May 9, 2008, Hoover, et al.
U.S. Appl. No. 12/031,733, filed Feb. 15, 2008, Hoover, et al.
U.S. Appl. No. 12/108,846, filed Apr. 24, 2008, Kuesel, et al.
U.S. Appl. No. 12/108,770, filed Apr. 24, 2008, Mejdrich, et al.
U.S. Appl. No. 12/029,647, filed Feb. 12, 2008, Hoover, et al.
U.S. Appl. No. 12/118,017, filed May 9, 2008, Comparan, et al.
U.S. Appl. No. 12/118,059, filed May 9, 2008, Mejdrich, et al.
U.S. Appl. No. 12/117,875, filed May 9, 2008, Hoover, et al.
U.S. Appl. No. 12/121,222, filed May 15, 2008, Kriegel, et al.
U.S. Appl. No. 11/936,873, filed Nov. 8, 2007, Hoover, et al.
U.S. Appl. No. 12/135,364, filed Jun. 9, 2008, Hoover, et al.
U.S. Appl. No. 11/937,579, filed Nov. 9, 2007, Mejdrich, et al.
U.S. Appl. No. 12/102,033, filed Apr. 14, 2008, Heil, et al.
U.S. Appl. No. 12/118,272, filed May 9, 2008, Kuesel, et al.
U.S. Appl. No. 12/118,039, filed May 9, 2008, Hoover, et al.
U.S. Appl. No. 11/945,396, filed Nov. 27, 2007, Hoover, et al.
U.S. Appl. No. 12/015,975, filed Jan. 17, 2008, Comparan, et al.
U.S. Appl. No. 12/117,906, filed May 9, 2008, Hoover, et al.
U.S. Appl. No. 12/233,180, filed Sep. 18, 2008, Hoover, et al.
U.S. Appl. No. 12/113,286, filed May 1, 2008, Heil, et al.
U.S. Appl. No. 11/955,553, filed Dec. 13, 2007, Comparan, et al.
U.S. Appl. No. 12/031,738, filed Feb. 15, 2008, Hoover, et al.
U.S. Appl. No. 11/972,753, filed Jan. 11, 2008, Mejdrich, et al.
U.S. Appl. No. 12/060,559, filed Apr. 1, 2008, Comparan, et al.
U.S. Appl. No. 11/926,212, filed Oct. 29, 2007, Hoover, et al.
U.S. Appl. No. 12/118,298, filed May 9, 2008, Heil, et al.
U.S. Appl. No. 12/118,315, filed May 9, 2008, Mejdrich, et al.
U.S. Appl. No. 11/938,376, filed Nov. 12, 2007, Mejdrich, et al.
U.S. Appl. No. 12/121,168, filed May 15, 2008, Hoover, et al.
Office Action Dated Jul. 20, 2009 in U.S. Appl. No. 12/031,733.
Kuskin, et al.; The Stanford Flash Multiprocessor; Jun. 6, 1996; Stanford University.
Steve Furber, Future Trends in SOC Interconnect, Aug. 2000.
Bolotin, et al., The Power of Priority:NoC based Distributed Cache Coherency, May 21, 2007, IEEE, pp. 117-126.
Mereu, Gianni. "Conception, Analysis, Design and Realization of a Multi-socket Network-on-Chip Architecture and of the Binary Translation support for VLIW core targeted to Systems-on-Chip", Mar. 2007, 145 pages, accessible at http://www.diee.unica.it/driei/tesi/19_mereu.pdf.
Huneycutt et al. "Software Caching using Dynamic Binary Rewriting for Embedded Devices", 2001, Proceedings of the International Conference on Parallel Processing, 10 pages.
Cifuentes et al. "Walkabout—A Retargetable Dynamic Binary Translation Framework", Sun Microsystems Laboratories, Jan. 2002, 13 pages.
Kavaldjiev et al. ("Providing QOS Guaranteed in a NOC by Virtual Channel Reservation"); 2006; pp. 1-12.
Monchiero ("Exploration of Distributed Shared Memory Architecture of NOC-Based Microprocessors", 2007) pp. 1-8.
Al-Hashimi; ("System-on-Chip—Net Generation Electronics", "Asynchronous on-chip networks"2006); Chapter 18 p. 1-32.
Final Office Action, U.S. Appl. No. 11/926,212, Mail Date Aug. 23, 2010.
Final Office Action, U.S. Appl. No. 11/955,553, Mail Date Sep. 13, 2010.
Final Office Action, U.S. Appl. No. 12/031,733, Mail Date Aug. 19, 2010.
Notice of Allowance, U.S. Appl. No. 12/118,298, Mail Date Aug. 18, 2010.
Office Action, U.S. Appl. No. 11/972,753, Mail Date Oct. 4, 2010.
Office Action, U.S. Appl. No. 12/015,975, Mail Date Jul. 22, 2010.
Office Action, U.S. Appl. No. 11/937,579, Mail Date Sep. 16, 2010.
Office Action; U.S. Appl. No. 12/118,059, Mail Date Sep. 1, 2010.
Office Action, U.S. Appl. No. 12/121,168, Mail Date Oct. 5, 2010.
Nikolay Kvaldjiev et al., A Virtual Channel Network-on-chip for GT and BE traffic, Apr. 2006, IEEE Emerging VLSI Technologies and Architectures.
Office Action, U.S. Appl. No. 11/926,212, Mail Date Dec. 7, 2010.
Office Action, U.S. Appl. No. 11/945,396, Mail Date Dec. 9, 2010.
Notice of Allowance, U.S. Appl. No. 11/955,553, Mail Date Nov. 22, 2010.
Notice of Allowance, U.S. Appl. No. 12/031,733, Mail Date Nov. 16, 2010.
Office Action, U.S. Appl. No. 12/118,017, Mail Date Dec. 8, 2010.
Office Action, U.S. Appl. No. 12/118,272, Mail Date Dec. 2, 2010.
Office Action, U.S. Appl. No. 12/108,846, Mail Date Dec. 2, 2010.
Final Office Action, U.S. Appl. No. 12/117,875, Mail Date Nov. 10, 2010.
Office Action, U.S. Appl. No. 12/117,906, Mail Date May 9, 2008.
Office Action, U.S. Appl. No. 12/060,559, Mail Date Nov. 3, 2010.
Advisory Action, U.S. Appl. No. 11/926,212, Mail Date Nov. 2, 2010.
Final Office Action, U.S. Appl. No. 11/972,753, Mail Date Feb. 18, 2011.
Final Office Action, U.S. Appl. No. 12/015,975, Mail Date Jan. 7, 2011.

Final Office Action, U.S. Appl. No. 12/108,846, Mail Date Feb. 17, 2011.
Final Office Action, U.S. Appl. No. 12/113,286, Mail Date Feb. 18, 2011.
Final Office Action, U.S. Appl. No. 12/118,059, Mail Date Feb. 17, 2011.

* cited by examiner

GRAPHICS RENDERING ON A NETWORK ON CHIP

BACKGROUND OF THE INVENTION

1. Field of the Invention

The field of the invention is data processing, or, more specifically apparatus and methods for graphics rendering with a network on chip ('NOC').

2. Description of Related Art

There are two widely used paradigms of data processing; multiple instructions, multiple data ('MIMD') and single instruction, multiple data ('SIMD'). In MIMD processing, a computer program is typically characterized as one or more threads of execution operating more or less independently, each requiring fast random access to large quantities of shared memory. MIMD is a data processing paradigm optimized for the particular classes of programs that fit it, including, for example, word processors, spreadsheets, database managers, many forms of telecommunications such as browsers, for example, and so on.

SIMD is characterized by a single program running simultaneously in parallel on many processors, each instance of the program operating in the same way but on separate items of data. SIMD is a data processing paradigm that is optimized for the particular classes of applications that fit it, including, for example, many forms of digital signal processing, vector processing, and so on.

There is another class of applications, however, including many real-world simulation programs, for example, for which neither pure SIMD nor pure MIMD data processing is optimized. That class of applications includes applications that benefit from parallel processing and also require fast random access to shared memory. For that class of programs, a pure MIMD system will not provide a high degree of parallelism and a pure SIMD system will not provide fast random access to main memory stores.

SUMMARY OF THE INVENTION

Methods and NOCs are provided for graphics rendering, where the NOC includes integrated processor ('IP') blocks, routers, memory communications controllers, and network interface controller, each IP block adapted to a router through a memory communications controller and a network interface controller, each memory communications controller controlling communication between an IP block and memory, and each network interface controller controlling inter-IP block communications through routers. The IP blocks include at least one geometry processor, a plurality of scan converters, and a plurality of pixel processors. Graphics rendering on a NOC according to the present invention includes receiving, in the geometry processor, a representation of an object to be rendered; converting, by the geometry processor, the representation of the object to two dimensional primitives; sending, by the geometry processor, the primitives to the plurality of scan converters; converting, by the scan converters, the primitives to fragments, wherein each fragment comprising one or more portions of a pixel. Graphics rendering on NOC according to the present invention also includes, for each fragment: selecting, by the scan converter for the fragment in dependence upon sorting rules, a pixel processor to process the fragment; sending, by the scan converter to the pixel processor, the fragment; and processing, by the pixel processor, the fragment to produce pixels for an image.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
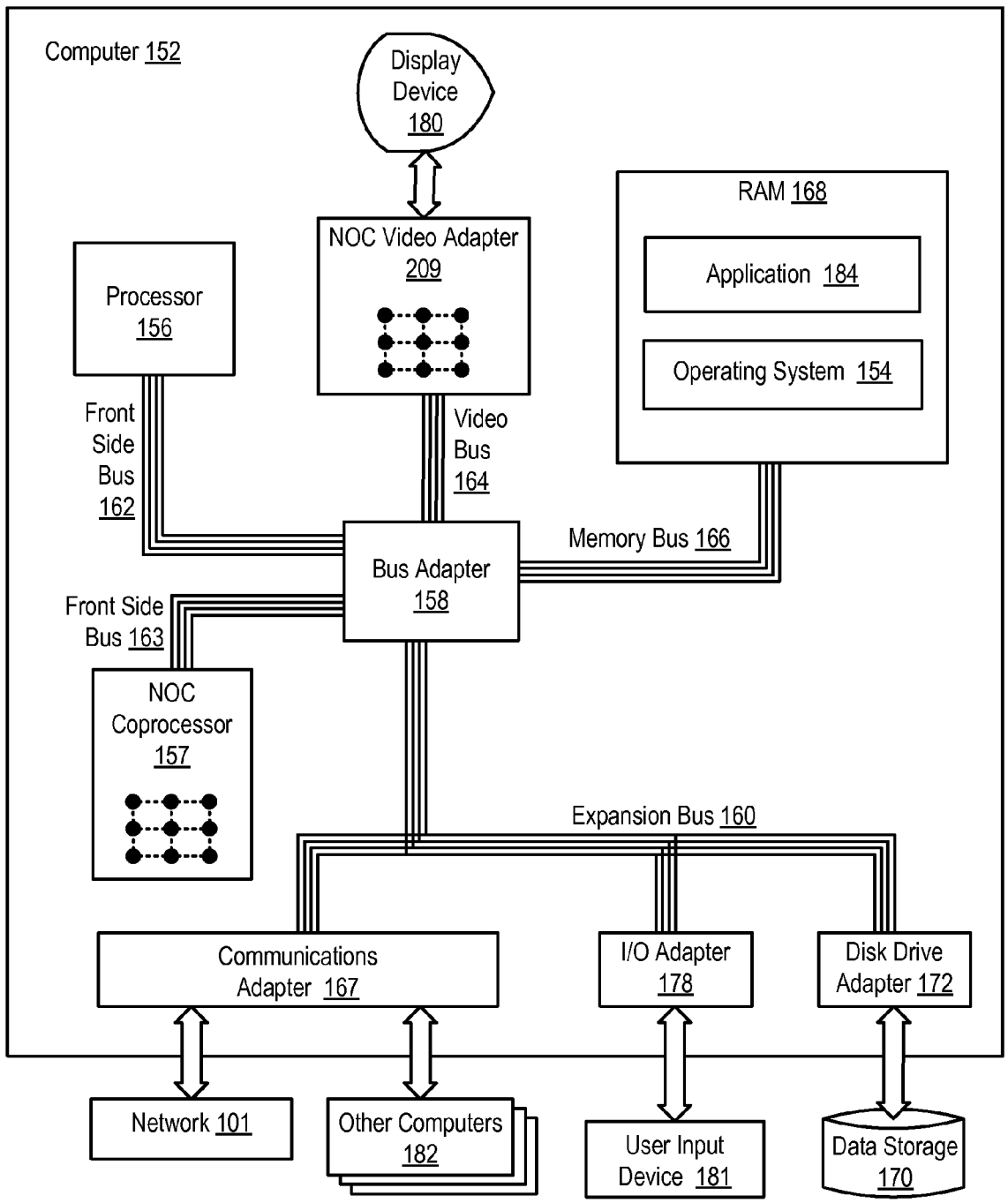
FIG. 1 sets forth a block diagram of automated computing machinery comprising an exemplary computer useful in data processing with a NOC according to embodiments of the present invention.

Exemplary apparatus and methods for graphics rendering and data processing with a NOC in accordance with the present invention are described with reference to the accompanying drawings, beginning with FIG. 1. FIG. 1 sets forth a block diagram of automated computing machinery comprising an exemplary computer (152) useful in data processing with a NOC according to embodiments of the present invention. The computer (152) of FIG. 1 includes at least one computer processor (156) or 'CPU' as well as random access memory (168) ('RAM') which is connected through a high speed memory bus (166) and bus adapter (158) to processor (156) and to other components of the computer (152).

Stored in RAM (168) is an application program (184), a module of user-level computer program instructions for carrying out particular data processing tasks such as, for example, word processing, spreadsheets, database operations, video gaming, stock market simulations, atomic quantum process simulations, or other user-level applications. Also stored in RAM (168) is an operating system (154). Operating systems useful data processing with a NOC according to embodiments of the present invention include UNIX™, Linux™, Microsoft XP™, AIX™, IBM's i5/OS™, and others as will occur to those of skill in the art. The operating system (154) and the application (184) in the example of FIG. 1 are shown in RAM (168), but many components of such software typically are stored in non-volatile memory also, such as, for example, on a disk drive (170).

The example computer (152) includes two example NOCs according to embodiments of the present invention: a video adapter (209) and a coprocessor (157). The video adapter (209) is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The example NOC coprocessor (157) is connected to processor (156) through bus adapter (158), and front side buses (162 and 163), which is also a high speed bus. The NOC coprocessor of FIG. 1 is optimized to accelerate particular data processing tasks at the behest of the main processor (156).

The example NOC video adapter (209) and NOC coprocessor (157) of FIG. 1 each include a NOC according to embodiments of the present invention, including integrated processor ('IP') blocks, routers, memory communications controllers, and network interface controllers, each IP block adapted to a router through a memory communications controller and a network interface controller, each memory communications controller controlling communication between an IP block and memory, and each network interface controller controlling inter-IP block communications through routers. Each IP block is also adapted to the network by a low latency, high bandwidth application messaging interconnect comprising an inbox and an outbox. The NOC video adapter and the NOC coprocessor are optimized for programs that use parallel processing and also require fast random access to shared memory. The details of the NOC structure and operation are discussed below with reference to FIGS. 2-6.

In the example NOC video adapter (209) of FIG. 1, the IP blocks include at least one geometry processor, a plurality of scan converters, and a plurality of pixel processors. At least one geometry processor is configured to receive a representation of an object to be rendered, such as vertices representing an object to be rendered, and the geometry processor is configured to convert the representation of the object to two dimensional primitives. The geometry processor is further configured to send the primitives to the plurality of scan converters. Each scan converter is configured to convert the primitives to fragments, each fragment comprising one or more portions of a pixel and each scan converter is configured to select, for each fragment in dependence upon sorting rules, a pixel processor to process the fragment. Each scan converter is also configured to send, to at least one of the pixel processors, the fragment; and the pixel processor receiving the fragment is configured to process the fragment to produce pixels for an image.

The computer (152) of FIG. 1 includes disk drive adapter (172) coupled through expansion bus (160) and bus adapter (158) to processor (156) and other components of the computer (152). Disk drive adapter (172) connects non-volatile data storage to the computer (152) in the form of disk drive (170). Disk drive adapters useful in computers for data processing with a NOC according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computer (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice.

The exemplary computer (152) of FIG. 1 includes a communications adapter (167) for data communications with other computers (182) and for data communications with a data communications network (100). Such data communications may be carried out serially through RS-232 connections, through external buses such as a Universal Serial Bus ('USB'), through data communications data communications networks such as IP data communications networks, and in other ways as will occur to those of skill in the art. Communications adapters implement the hardware level of data communications through which one computer sends data communications to another computer, directly or through a data communications network. Examples of communications adapters useful for data processing with a NOC according to embodiments of the present invention include modems for wired dial-up communications, Ethernet (IEEE 802.3) adapters for wired data communications network communications, and 802.11 adapters for wireless data communications network communications.

Figure 2:
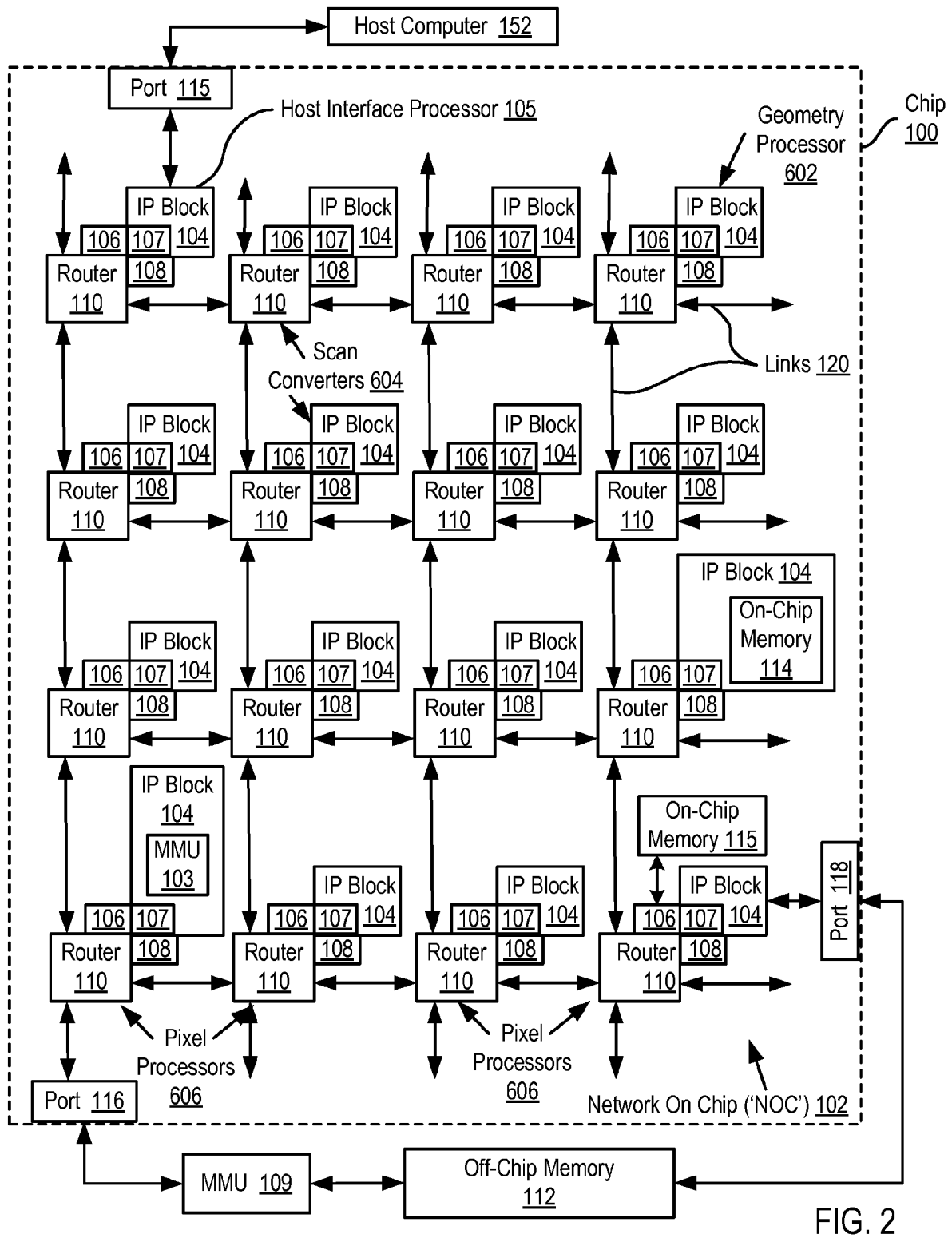
FIG. 2 sets forth a functional block diagram of an example NOC according to embodiments of the present invention.

For further explanation, FIG. 2 sets forth a functional block diagram of an example NOC (102) according to embodiments of the present invention. The NOC in the example of FIG. 1 is implemented on a 'chip' (100), that is, on an integrated circuit. The NOC (102) of FIG. 2 includes integrated processor ('IP') blocks (104), routers (110), memory communications controllers (106), and network interface controllers (108). Each IP block (104) is adapted to a router (110) through a memory communications controller (106) and a network interface controller (108). Each memory communications controller controls communications between an IP block and memory, and each network interface controller (108) controls inter-IP block communications through routers (110).

In the NOC (102) of FIG. 2, each IP block represents a reusable unit of synchronous or asynchronous logic design used as a building block for data processing within the NOC. The term 'IP block' is sometimes expanded as 'intellectual property block,' effectively designating an IP block as a design that is owned by a party, that is the intellectual property of a party, to be licensed to other users or designers of semiconductor circuits. In the scope of the present invention, however, there is no requirement that IP blocks be subject to any particular ownership, so the term is always expanded in this specification as 'integrated processor block.' IP blocks, as specified here, are reusable units of logic, cell, or chip layout design that may or may not be the subject of intellectual property. IP blocks are logic cores that can be formed as ASIC chip designs or FPGA logic designs.

One way to describe IP blocks by analogy is that IP blocks are for NOC design what a library is for computer programming or a discrete integrated circuit component is for printed circuit board design. In NOCs according to embodiments of the present invention, IP blocks may be implemented as generic gate netlists, as complete special purpose or general purpose microprocessors, or in other ways as may occur to those of skill in the art. A netlist is a Boolean-algebra representation (gates, standard cells) of an IP block's logical-function, analogous to an assembly-code listing for a high-level program application. NOCs also may be implemented, for example, in synthesizable form, described in a hardware description language such as Verilog or VHDL. In addition to netlist and synthesizable implementation, NOCs also may be delivered in lower-level, physical descriptions. Analog IP block elements such as SERDES, PLL, DAC, ADC, and so on, may be distributed in a transistor-layout format such as GDSII. Digital elements of IP blocks are sometimes offered in layout format as well.

In the example of FIG. 2, each IP block includes a low latency, high bandwidth application messaging interconnect (107) that adapts the IP block to the network for purposes of data communications among IP blocks. As described in more detail below, each such messaging interconnect includes an inbox and an outbox.

Each IP block (104) in the example of FIG. 2 is adapted to a router (110) through a memory communications controller (106). Each memory communication controller is an aggregation of synchronous and asynchronous logic circuitry adapted to provide data communications between an IP block and memory. Examples of such communications between IP blocks and memory include memory load instructions and memory store instructions. The memory communications controllers (106) are described in more detail below with reference to FIG. 3.

Each IP block (104) in the example of FIG. 2 is also adapted to a router (110) through a network interface controller (108). Each network interface controller (108) controls communications through routers (110) between IP blocks (104). Examples of communications between IP blocks (104) include messages carrying data and instructions for processing the data among IP blocks in parallel applications and in pipelined applications. The network interface controllers (108) are described in more detail below with reference to FIG. 3.

Each IP block (104) in the example of FIG. 2 is adapted to a router (110). The routers (110) and links (120) among the routers implement the network operations of the NOC. The links (120) are packets structures implemented on physical, parallel wire buses connecting all the routers. That is, each link is implemented on a wire bus wide enough to accommodate simultaneously an entire data switching packet, including all header information and payload data. If a packet structure includes 64 bytes, for example, including an eight byte header and 56 bytes of payload data, then the wire bus subtending each link is 64 bytes wise, 512 wires. In addition, each link is bidirectional, so that if the link packet structure includes 64 bytes, the wire bus actually contains 1024 wires between each router and each of its neighbors in the network. A message can includes more than one packet, but each packet fits precisely onto the width of the wire bus. If the connection between the router and each section of wire bus is referred to as a port, then each router includes five ports, one for each of four directions of data transmission on the network and a fifth port for adapting the router to a particular IP block through a memory communications controller and a network interface controller.

Each memory communications controller (106) in the example of FIG. 2 controls communications between an IP block and memory. Memory can include off-chip main RAM (112), memory (115) connected directly to an IP block through a memory communications controller (106), on-chip memory enabled as an IP block (114), and on-chip caches. In the NOC of FIG. 2, either of the on-chip memories (114, 115), for example, may be implemented as on-chip cache memory. All these forms of memory can be disposed in the same address space, physical addresses or virtual addresses, true even for the memory attached directly to an IP block. Memory-addressed messages therefore can be entirely bidirectional with respect to IP blocks, because such memory can be addressed directly from any IP block anywhere on the network. Memory (114) on an IP block can be addressed from that IP block or from any other IP block in the NOC. Memory (115) attached directly to a memory communication controller can be addressed by the IP block that is adapted to the network by that memory communication controller—and can also be addressed from any other IP block anywhere in the NOC.

The example NOC includes two memory management units ('MMUs') (103, 109), illustrating two alternative memory architectures for NOCs according to embodiments of the present invention. MMU (103) is implemented with an IP block, allowing a processor within the IP block to operate in virtual memory while allowing the entire remaining architecture of the NOC to operate in a physical memory address space. The MMU (109) is implemented off-chip, connected to the NOC through a data communications port (116). The port (116) includes the pins and other interconnections required to conduct signals between the NOC and the MMU, as well as sufficient intelligence to convert message packets from the NOC packet format to the bus format required by the external MMU (109). The external location of the MMU means that all processors in all IP blocks of the NOC can operate in virtual memory address space, with all conversions to physical addresses of the off-chip memory handled by the off-chip MMU (109).

In addition to the two memory architectures illustrated by use of the MMUs (103, 109), data communications port (118) illustrates a third memory architecture useful in NOCs according to embodiments of the present invention. Port (118) provides a direct connection between an IP block (104) of the NOC (102) and off-chip memory (112). With no MMU in the processing path, this architecture provides utilization of a physical address space by all the IP blocks of the NOC. In sharing the address space bi-directionally, all the IP blocks of the NOC can access memory in the address space by memory-addressed messages, including loads and stores, directed through the IP block connected directly to the port (118). The port (118) includes the pins and other interconnections required to conduct signals between the NOC and the off-chip memory (112), as well as sufficient intelligence to convert message packets from the NOC packet format to the bus format required by the off-chip memory (112).

In the example of FIG. 2, one of the IP blocks is designated a host interface processor (105). A host interface processor (105) provides an interface between the NOC and a host computer (152) in which the NOC may be installed and also provides data processing services to the other IP blocks on the NOC, including, for example, receiving and dispatching among the IP blocks of the NOC data processing requests from the host computer. A NOC may, for example, implement a video graphics adapter (209) or a coprocessor (157) on a larger computer (152) as described above with reference to FIG. 1. In the example of FIG. 2, the host interface processor (105) is connected to the larger host computer through a data communications port (115). The port (115) includes the pins and other interconnections required to conduct signals between the NOC and the host computer, as well as sufficient intelligence to convert message packets from the NOC to the bus format required by the host computer (152). In the example of the NOC coprocessor in the computer of FIG. 1, such a port would provide data communications format translation between the link structure of the NOC coprocessor (157) and the protocol required for the front side bus (163) between the NOC coprocessor (157) and the bus adapter (158).

The exemplary NOC of FIG. 2 may be used for graphics rendering. The NOC includes an IP block implementing a geometry processor (602). The geometry processor (602) of FIG. 2 represents a reusable unit of synchronous or asynchronous logic and flexibly configurable computer program instructions optimized to receive representations of an object to be rendered using the NOC and convert the representations of the object to two dimensional primitives. In the exemplary NOC of FIG. 2 the geometry processor (602) is configured to receive a representation of an object to be rendered and convert the representation of the object to two dimensional primitives. The geometry processor is also configured to send the primitives to the plurality of scan converters.

The NOC of FIG. 2 includes a plurality of IP blocks implementing scan converters (604). The scan converters (604) of FIG. 2 represent reusable units of synchronous or asynchronous logic and flexibly configurable computer program instructions optimized to convert the primitives to fragments, where each fragment includes one or more portions of a pixel. Each scan converter of FIG. 2 is configured to convert the primitives to fragments and select, for each fragment in dependence upon sorting rules, a pixel processor (606) to process the fragment that assigned to a portion of an image for processing fragments in that portion of the image. The scan converter of FIG. 2 compares the locations of the pixel fragment with a set of image coordinates defining each portion of the image assigned to each pixel processor and send the fragment to the selected pixel processor or pixel processors assigned to a portion of an image for processing fragments in that portion of the image.

The NOC of FIG. 2 includes a plurality of IP blocks implementing pixel processors. The pixel processors of FIG. 2 represent reusable units of synchronous or asynchronous logic and flexibly configurable computer program instructions optimized to process the fragment to produce pixels for an image. The collection of pixels in a pixel buffer represent an image to be rendered using the NOC of FIG. 2. Each pixel processor in the example of FIG. 2 is assigned to a portion of an image for processing fragments in that portion of the image.

In the NOC of FIG. 2 each IP block implementing a geometry processor (602), a scan converter (604), or an pixel processor (606) also includes an inbox and an outbox; and the geometry processor (602), the scan converters (604), and the pixel processors (606) are adapted to the network by a low latency, high bandwidth application messaging interconnect comprising an inbox and an outbox. The geometry processor is configured to receive a representation of an object to be rendered through an inbox of the IP block on which the geometry processor is running and send the primitives to the plurality of scan converters through an outbox of the IP block on which the geometry processor is running. The scan converters are configured to send the fragment through an outbox of the IP block on which the scan converter is running to an inbox of the IP block on which the pixel processor is running.

Figure 3:
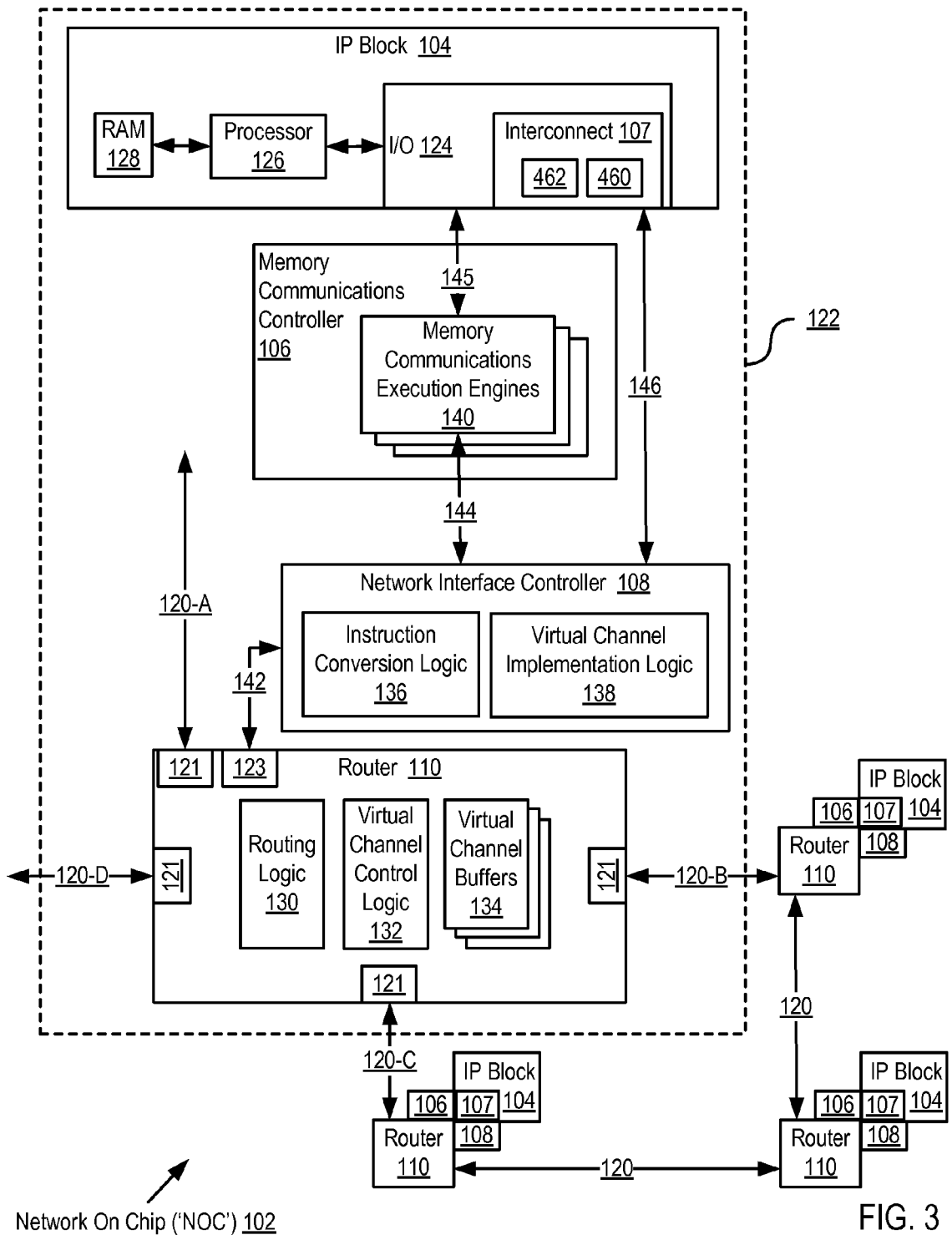
FIG. 3 sets forth a functional block diagram of a further example NOC according to embodiments of the present invention.

For further explanation, FIG. 3 sets forth a functional block diagram of a further example NOC according to embodiments of the present invention. The example NOC of FIG. 3 is similar to the example NOC of FIG. 2 in that the example NOC of FIG. 3 is implemented on a chip (100 on FIG. 2), and the NOC (102) of FIG. 3 includes integrated processor ('IP') blocks (104), routers (110), memory communications controllers (106), and network interface controllers (108). Each IP block (104) is adapted to a router (110) through a memory communications controller (106) and a network interface controller (108). Each memory communications controller controls communications between an IP block and memory, and each network interface controller (108) controls inter-IP block communications through routers (110). In the example of FIG. 3, one set (122) of an IP block (104) adapted to a router (110) through a memory communications controller (106) and network interface controller (108) is expanded to aid a more detailed explanation of their structure and operations. All the IP blocks, memory communications controllers, network interface controllers, and routers in the example of FIG. 3 are configured in the same manner as the expanded set (122).

In the example of FIG. 3, each IP block (104) includes a computer processor (126) and I/O functionality (124). In this example, computer memory is represented by a segment of random access memory ('RAM') (128) in each IP block (104). The memory, as described above with reference to the example of FIG. 2, can occupy segments of a physical address space whose contents on each IP block are addressable and accessible from any IP block in the NOC. The processors (126), I/O capabilities (124), and memory (128) on each IP block effectively implement the IP blocks as generally programmable microcomputers. As explained above, however, in the scope of the present invention, IP blocks generally represent reusable units of synchronous or asynchronous logic used as building blocks for data processing within a NOC. Implementing IP blocks as generally programmable microcomputers, therefore, although a common embodiment useful for purposes of explanation, is not a limitation of the present invention.

In the example of FIG. 2, each IP block includes a low latency, high bandwidth application messaging interconnect (107) that adapts the IP block to the network for purposes of data communications among IP blocks. As described in more detail below, each such messaging interconnect includes an inbox (460) and an outbox (462).

In the NOC (102) of FIG. 3, each memory communications controller (106) includes a plurality of memory communications execution engines (140). Each memory communications execution engine (140) is enabled to execute memory communications instructions from an IP block (104), including bidirectional memory communications instruction flow (142, 144, 145) between the network and the IP block (104). The memory communications instructions executed by the memory communications controller may originate, not only from the IP block adapted to a router through a particular memory communications controller, but also from any IP block (104) anywhere in the NOC (102). That is, any IP block in the NOC can generate a memory communications instruction and transmit that memory communications instruction through the routers of the NOC to another memory communications controller associated with another IP block for execution of that memory communications instruction. Such memory communications instructions can include, for example, translation lookaside buffer control instructions, cache control instructions, barrier instructions, and memory load and store instructions.

Each memory communications execution engine (140) is enabled to execute a complete memory communications instruction separately and in parallel with other memory communications execution engines. The memory communications execution engines implement a scalable memory transaction processor optimized for concurrent throughput of memory communications instructions. The memory communications controller (106) supports multiple memory communications execution engines (140) all of which run concurrently for simultaneous execution of multiple memory communications instructions. A new memory communications instruction is allocated by the memory communications controller (106) to a memory communications engine (140) and the memory communications execution engines (140) can accept multiple response events simultaneously. In this example, all of the memory communications execution engines (140) are identical. Scaling the number of memory communications instructions that can be handled simultaneously by a memory communications controller (106), therefore, is implemented by scaling the number of memory communications execution engines (140).

In the NOC (102) of FIG. 3, each network interface controller (108) is enabled to convert communications instructions from command format to network packet format for transmission among the IP blocks (104) through routers (110). The communications instructions are formulated in command format by the IP block (104) or by the memory communications controller (106) and provided to the network interface controller (108) in command format. The command format is a native format that conforms to architectural register files of the IP block (104) and the memory communications controller (106). The network packet format is the format required for transmission through routers (110) of the network. Each such message is composed of one or more network packets. Examples of such communications instructions that are converted from command format to packet format in the network interface controller include memory load instructions and memory store instructions between IP blocks and memory. Such communications instructions may also include communications instructions that send messages among IP blocks carrying data and instructions for processing the data among IP blocks in parallel applications and in pipelined applications.

In the NOC (102) of FIG. 3, each IP block is enabled to send memory-address-based communications to and from memory through the IP block's memory communications controller and then also through its network interface controller to the network. A memory-address-based communications is a memory access instruction, such as a load instruction or a store instruction, that is executed by a memory communication execution engine of a memory communications controller of an IP block. Such memory-address-based communications typically originate in an IP block, formulated in command format, and handed off to a memory communications controller for execution.

Many memory-address-based communications are executed with message traffic, because any memory to be accessed may be located anywhere in the physical memory address space, on-chip or off-chip, directly attached to any memory communications controller in the NOC, or ultimately accessed through any IP block of the NOC—regardless of which IP block originated any particular memory-address-based communication. All memory-address-based communication that are executed with message traffic are passed from the memory communications controller to an associated network interface controller for conversion (136) from command format to packet format and transmission through the network in a message. In converting to packet format, the network interface controller also identifies a network address for the packet in dependence upon the memory address or addresses to be accessed by a memory-address-based communication. Memory address based messages are addressed with memory addresses. Each memory address is mapped by the network interface controllers to a network address, typically the network location of a memory communications controller responsible for some range of physical memory addresses. The network location of a memory communication controller (106) is naturally also the network location of that memory communication controller's associated router (110), network interface controller (108), and IP block (104). The instruction conversion logic (136) within each network interface controller is capable of converting memory addresses to network addresses for purposes of transmitting memory-address-based communications through routers of a NOC.

Upon receiving message traffic from routers (110) of the network, each network interface controller (108) inspects each packet for memory instructions. Each packet containing a memory instruction is handed to the memory communications controller (106) associated with the receiving network interface controller, which executes the memory instruction before sending the remaining payload of the packet to the IP block for further processing. In this way, memory contents are always prepared to support data processing by an IP block before the IP block begins execution of instructions from a message that depend upon particular memory content.

In the NOC (102) of FIG. 3, each IP block (104) is enabled to bypass its memory communications controller (106) and send inter-IP block, network-addressed communications (146) directly to the network through the IP block's network interface controller (108). Network-addressed communications are messages directed by a network address to another IP block. Such messages transmit working data in pipelined applications, multiple data for single program processing among IP blocks in a SIMD application, and so on, as will occur to those of skill in the art. Such messages are distinct from memory-address-based communications in that they are network addressed from the start, by the originating IP block which knows the network address to which the message is to be directed through routers of the NOC. Such network-addressed communications are passed by the IP block through it I/O functions (124) directly to the IP block's network interface controller in command format, then converted to packet format by the network interface controller and transmitted through routers of the NOC to another IP block. Such network-addressed communications (146) are bi-directional, potentially proceeding to and from each IP block of the NOC, depending on their use in any particular application. Each network interface controller, however, is enabled to both send and receive (142) such communications to and from an associated router, and each network interface controller is enabled to both send and receive (146) such communications directly to and from an associated IP block, bypassing an associated memory communications controller (106).

Each network interface controller (108) in the example of FIG. 3 is also enabled to implement virtual channels on the network, characterizing network packets by type. Each network interface controller (108) includes virtual channel implementation logic (138) that classifies each communication instruction by type and records the type of instruction in a field of the network packet format before handing off the instruction in packet form to a router (110) for transmission on the NOC. Examples of communication instruction types include inter-IP block network-address-based messages, request messages, responses to request messages, invalidate messages directed to caches; memory load and store messages; and responses to memory load messages, and so on.

Each router (110) in the example of FIG. 3 includes routing logic (130), virtual channel control logic (132), and virtual channel buffers (134). The routing logic typically is implemented as a network of synchronous and asynchronous logic that implements a data communications protocol stack for data communication in the network formed by the routers (110), links (120), and bus wires among the routers. The routing logic (130) includes the functionality that readers of skill in the art might associate in off-chip networks with routing tables, routing tables in at least some embodiments being considered too slow and cumbersome for use in a NOC. Routing logic implemented as a network of synchronous and asynchronous logic can be configured to make routing decisions as fast as a single clock cycle. The routing logic in this example routes packets by selecting a port for forwarding each packet received in a router. Each packet contains a network address to which the packet is to be routed. Each router in this example includes five ports, four ports (121) connected through bus wires (120-A, 120-B, 120-C, 120-D) to other routers and a fifth port (123) connecting each router to its associated IP block (104) through a network interface controller (108) and a memory communications controller (106).

In describing memory-address-based communications above, each memory address was described as mapped by network interface controllers to a network address, a network location of a memory communications controller. The network location of a memory communication controller (106) is naturally also the network location of that memory communication controller's associated router (110), network interface controller (108), and IP block (104). In inter-IP block, or network-address-based communications, therefore, it is also typical for application-level data processing to view network addresses as location of IP block within the network formed by the routers, links, and bus wires of the NOC. FIG. 2 illustrates that one organization of such a network is a mesh of rows and columns in which each network address can be implemented, for example, as either a unique identifier for each set of associated router, IP block, memory communications controller, and network interface controller of the mesh or x,y coordinates of each such set in the mesh.

In the NOC (102) of FIG. 3, each router (110) implements two or more virtual communications channels, where each virtual communications channel is characterized by a communication type. Communication instruction types, and therefore virtual channel types, include those mentioned above: inter-IP block network-address-based messages, request messages, responses to request messages, invalidate messages directed to caches; memory load and store messages; and responses to memory load messages, and so on. In support of virtual channels, each router (110) in the example of FIG. 3 also includes virtual channel control logic (132) and virtual channel buffers (134). The virtual channel control logic (132) examines each received packet for its assigned communications type and places each packet in an outgoing virtual channel buffer for that communications type for transmission through a port to a neighboring router on the NOC.

Each virtual channel buffer (134) has finite storage space. When many packets are received in a short period of time, a virtual channel buffer can fill up—so that no more packets can be put in the buffer. In other protocols, packets arriving on a virtual channel whose buffer is full would be dropped. Each virtual channel buffer (134) in this example, however, is enabled with control signals of the bus wires to advise surrounding routers through the virtual channel control logic to suspend transmission in a virtual channel, that is, suspend transmission of packets of a particular communications type. When one virtual channel is so suspended, all other virtual channels are unaffected—and can continue to operate at full capacity. The control signals are wired all the way back through each router to each router's associated network interface controller (108). Each network interface controller is configured to, upon receipt of such a signal, refuse to accept, from its associated memory communications controller (106) or from its associated IP block (104), communications instructions for the suspended virtual channel. In this way, suspension of a virtual channel affects all the hardware that implements the virtual channel, all the way back up to the originating IP blocks.

One effect of suspending packet transmissions in a virtual channel is that no packets are ever dropped in the architecture of FIG. 3. When a router encounters a situation in which a packet might be dropped in some unreliable protocol such as, for example, the Internet Protocol, the routers in the example of FIG. 3 suspend by their virtual channel buffers (134) and their virtual channel control logic (132) all transmissions of packets in a virtual channel until buffer space is again available, eliminating any need to drop packets. The NOC of FIG. 3, therefore, implements highly reliable network communications protocols with an extremely thin layer of hardware.

Figure 4:
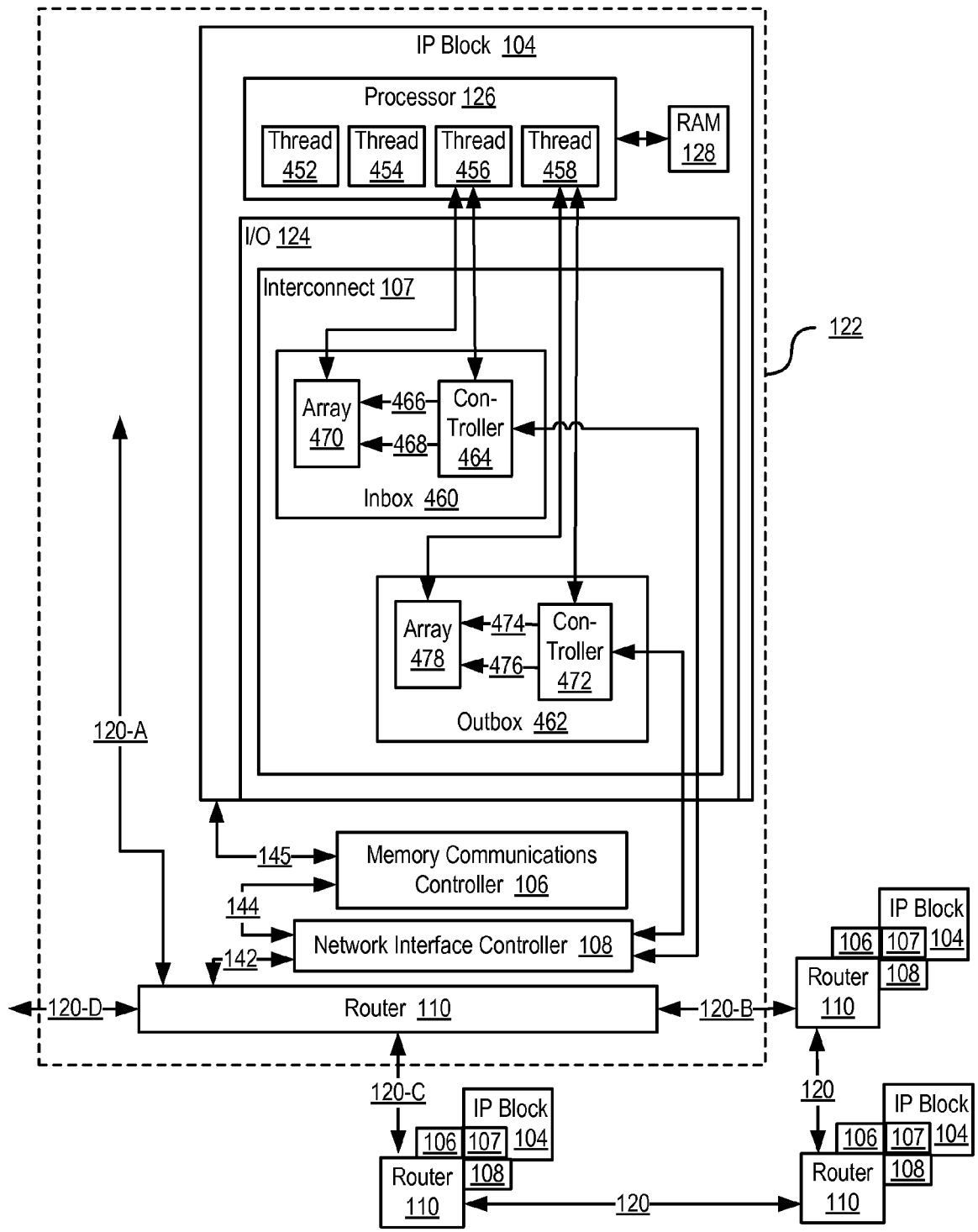
FIG. 4 sets forth a functional block diagram of a further example NOC according to embodiments of the present invention.

For further explanation, FIG. 4 sets forth a functional block diagram of a further example NOC according to embodiments of the present invention. The example NOC of FIG. 4 is similar to the example NOC of FIG. 2 in that the example NOC of FIG. 4 is implemented on a chip (100 on FIG. 2), and the NOC (102) of FIG. 4 includes integrated processor ('IP') blocks (104), routers (110), memory communications controllers (106), and network interface controllers (108). Each IP block (104) is adapted to a router (110) through a memory communications controller (106) and a network interface controller (108). Each memory communications controller controls communications between an IP block and memory, and each network interface controller (108) controls inter-IP block communications through routers (110).

In the example of FIG. 4, each IP block includes a low latency, high bandwidth application messaging interconnect (107) that adapts the IP block to the network for purposes of data communications among IP blocks. The low latency, high bandwidth application messaging interconnect (107) is an interconnect in the sense that it is composed of sequential and non-sequential logic that connects an IP block (104) to a network interface controller (108) for purposes of data communications. The low latency, high bandwidth application messaging interconnect (107) is a low latency, high bandwidth interconnect in that it provides a very fast interconnection between the IP block and the network interface controller—so fast because from the point of view of the IP block, for outgoing messages, the process of sending a message to the network interface controller represents a single immediate write to high speed local memory in the outbox array (478), and receiving a message in the IP block (104) from the network interface controller (108) represents a single read operation from a high speed local memory in the inbox array (470). As described in more detail below, each such messaging interconnect (107) includes an inbox (460) and an outbox (462). In the example of FIG. 4, one set (122) of an IP block (104) adapted to a router (110) through a memory communications controller (106) and network interface controller (108) is expanded to aid a more detailed explanation of the structure and operations of the messaging interconnect (107). All the IP blocks, memory communications controllers, network interface controllers, and routers in the example of FIG. 4 are configured in the same manner as the expanded set (122).

In the example NOC of FIG. 4, each outbox (462) includes an array (478) of memory indexed by an outbox write pointer (474) and an outbox read pointer (476). Each outbox (462) also includes an outbox message controller (472). In the example NOC of FIG. 4, the outbox has an associated thread of execution (458) that is a module of computer program instructions executing on a processor of the IP block. Each such associated thread of execution (458) is enabled to write message data into the array (478) and to provide to the outbox message controller (472) message control information, including message destination identification and an indication that message data in the array (478) is ready to be sent.

The message control information, such as destination address or message identification, and other control information such as 'ready to send,' may be written to registers in the outbox message controller (472) or such information may be written into the array (478) itself as part of the message data, in a message header, message meta-data, or the like.

The outbox message controller (472) is implemented as a network of sequential and non-sequential logic that is enabled to set the outbox write pointer (474). The outbox write pointer (474) may be implemented, for example, as a register in the outbox message controller (472) that stores the memory address of the location in the array where the associated thread of execution is authorized to write message data. The outbox message controller (472) is also enabled to set the outbox read pointer (476). The outbox read pointer (476) may be implemented, for example, as a register in the outbox message controller (472) that stores the memory address of the location in the array where the outbox message controller is to read its next message data for transmission over the network from the outbox.

The outbox message controller (472) is also enabled to send to the network message data written into the array (478) by the thread of execution (458) associated with the outbox (462). In the NOC (102) of FIG. 4, each network interface controller (108) is enabled to convert communications instructions from command format to network packet format for transmission among the IP blocks (104) through routers (110). The communications instructions are formulated in command format by the associated thread of execution (458) in the IP block (104) and provided by the outbox message controller (472) to the network interface controller (108) in command format. The command format is a native format that conforms to architectural register files of the IP block (104) and the outbox message controller (472). The network packet format is the format required for transmission through routers (110) of the network. Each such message is composed of one or more network packets. Such communications instructions may include, for example, communications instructions that send messages among IP blocks carrying data and instructions for processing the data among IP blocks in parallel applications and in pipelined applications.

In the example NOC of FIG. 4, each inbox (460) includes an array (470) of memory indexed by an inbox write pointer (466) and an inbox read pointer (468). Each inbox (460) also includes an inbox message controller (464). The inbox message controller (454) is implemented as a network of sequential and non-sequential logic that is enabled to set the inbox write pointer (466). The inbox write pointer (466) may be implemented, for example, as a register in the inbox message controller (454) that stores the memory address of the beginning location in the array (470) where message data from an outbox of another IP block is to be written. The inbox message controller (454) is also enabled to set the inbox read pointer (468). The inbox read pointer (468) may be implemented, for example, as a register in the inbox message controller (454) that stores the memory address of the beginning location in the array (470) where an associated thread of execution (456) may read the next message received from an outbox of some other IP block.

In the example NOC of FIG. 4, the inbox has an associated thread of execution (456) that is a module of computer program instructions executing on a processor of the IP block. Each such associated thread of execution (456) is enabled to read from the array message data sent from some other outbox of another IP block. The thread of execution may be notified that message data sent from another outbox of another IP block has been written into the array by the message controller through a flag set in a status register, for example.

The inbox message controller (454) is also enabled to receive from the network message data written to the network from an outbox of another IP block and provide to a thread of execution (456) associated with the inbox (460) the message data received from the network. The inbox message controller of FIG. 4 receives from a network interface controller (108) message data from an outbox of some other IP block and writes the received message data to the array (470). Upon writing the received message data to the array, the inbox message controller (464) is also enabled to notify the thread of execution (456) associated with the inbox that message data has been received from the network by, for example, setting a data-ready flag in a status register of the inbox message controller (454). The associated thread of execution may, for example, 'sleep until flag' before a message load, or a load opcode can be configured to check a data-ready flag in the inbox message controller.

Figure 5:
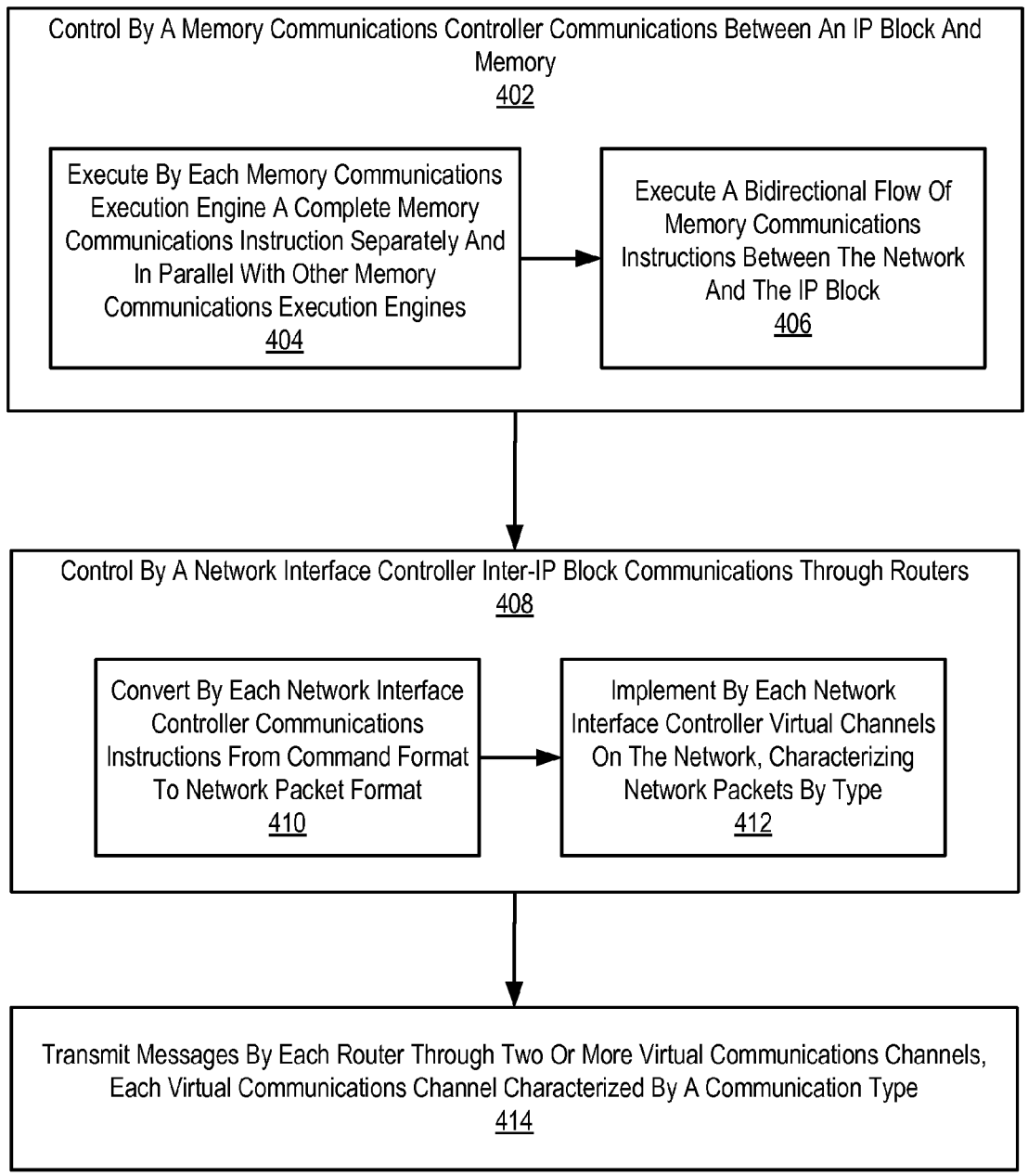
FIG. 5 sets forth a flow chart illustrating an exemplary method for data processing with a NOC according to embodiments of the present invention.

For further explanation, FIG. 5 sets forth a flow chart illustrating an exemplary method for data processing with a NOC according to embodiments of the present invention. The method of FIG. 5 is implemented on a NOC similar to the ones described above in this specification, a NOC (102 on FIG. 3) that is implemented on a chip (100 on FIG. 3) with IP blocks (104 on FIG. 3), routers (110 on FIG. 3), memory communications controllers (106 on FIG. 3), and network interface controllers (108 on FIG. 3). Each IP block (104 on FIG. 3) is adapted to a router (110 on FIG. 3) through a memory communications controller (106 on FIG. 3) and a network interface controller (108 on FIG. 3). In the method of FIG. 5, each IP block may be implemented as a reusable unit of synchronous or asynchronous logic design used as a building block for data processing within the NOC.

The method of FIG. 5 includes controlling (402) by a memory communications controller (106 on FIG. 3) communications between an IP block and memory. In the method of FIG. 5, the memory communications controller includes a plurality of memory communications execution engines (140 on FIG. 3). Also in the method of FIG. 5, controlling (402) communications between an IP block and memory is carried out by executing (404) by each memory communications execution engine a complete memory communications instruction separately and in parallel with other memory communications execution engines and executing (406) a bidirectional flow of memory communications instructions between the network and the IP block. In the method of FIG. 5, memory communications instructions may include translation lookaside buffer control instructions, cache control instructions, barrier instructions, memory load instructions, and memory store instructions. In the method of FIG. 5, memory may include off-chip main RAM, memory connected directly to an IP block through a memory communications controller, on-chip memory enabled as an IP block, and on-chip caches.

The method of FIG. 5 also includes controlling (408) by a network interface controller (108 on FIG. 3) inter-IP block communications through routers. In the method of FIG. 5, controlling (408) inter-IP block communications also includes converting (410) by each network interface controller communications instructions from command format to network packet format and implementing (412) by each network interface controller virtual channels on the network, including characterizing network packets by type.

The method of FIG. 5 also includes transmitting (414) messages by each router (110 on FIG. 3) through two or more virtual communications channels, where each virtual communications channel is characterized by a communication type. Communication instruction types, and therefore virtual channel types, include, for example: inter-IP block network-address-based messages, request messages, responses to request messages, invalidate messages directed to caches; memory load and store messages; and responses to memory load messages, and so on. In support of virtual channels, each router also includes virtual channel control logic (132 on FIG. 3) and virtual channel buffers (134 on FIG. 3). The virtual channel control logic examines each received packet for its assigned communications type and places each packet in an outgoing virtual channel buffer for that communications type for transmission through a port to a neighboring router on the NOC.

Figure 6:
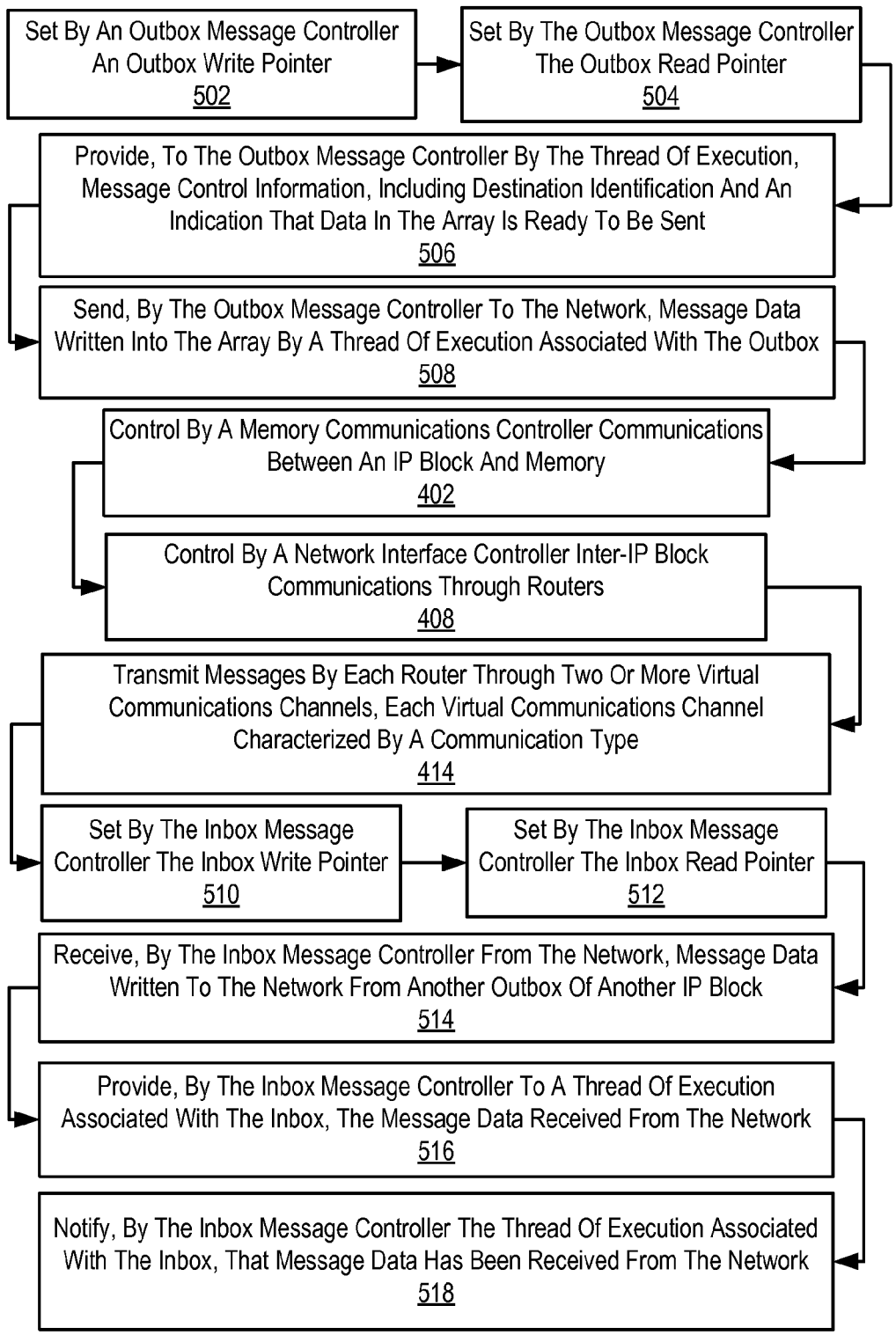
FIG. 6 sets forth a flow chart illustrating a further exemplary method for data processing with a NOC according to embodiments of the present invention.

For further explanation, FIG. 6 sets forth a flow chart illustrating a further exemplary method for data processing with a NOC according to embodiments of the present invention. The method of FIG. 6 is similar to the method of FIG. 5 in that the method of FIG. 6 is implemented on a NOC similar to the ones described above in this specification, a NOC (102 on FIG. 3) that is implemented on a chip (100 on FIG. 3) with IP blocks (104 on FIG. 3), routers (110 on FIG. 3), memory communications controllers (106 on FIG. 3), and network interface controllers (108 on FIG. 3). Each IP block (104 on FIG. 3) is adapted to a router (110 on FIG. 3) through a memory communications controller (106 on FIG. 3) and a network interface controller (108 on FIG. 3).

In the method of FIG. 6, each IP block (104 on FIG. 3) may be implemented as a reusable unit of synchronous or asynchronous logic design used as a building block for data processing within the NOC, and each IP block is also adapted to the network by a low latency, high bandwidth application messaging interconnect (107 on FIG. 4) comprising an inbox (460 on FIG. 4) and an outbox (462 on FIG. 4). In the method of FIG. 6, each outbox (462 on FIG. 4) includes an outbox message controller (472 on FIG. 4) and an array (478 on FIG. 4) for storing message data, with the array indexed by an outbox write pointer (474 on FIG. 4) and an outbox read pointer (476 on FIG. 4). In the method of FIG. 6, each inbox (460 on FIG. 4) includes an inbox message controller (464 on FIG. 4) and an array (470 on FIG. 4) for storing message data, with the array (470 on FIG. 4) indexed by an inbox write pointer (466 on FIG. 4) and an inbox read pointer (468 on FIG. 4).

The method of FIG. 6, like the method of FIG. 5, method the following methods steps which operate in a similar manner as described above with regard to the method of FIG. 5: controlling (402) by each memory communications controller communications between an IP block and memory, controlling (408) by each network interface controller inter-IP block communications through routers, and transmitting (414) messages by each router (110 on FIG. 3) through two or more virtual communications channels, where each virtual communications channel is characterized by a communication type.

In addition to its similarities to the method of FIG. 5, however, the method of FIG. 6 also includes setting (502) by the outbox message controller the outbox write pointer. The outbox write pointer (474 on FIG. 4) may be implemented, for example, as a register in the outbox message controller (472 on FIG. 4) that stores the memory address of the location in the array where the associated thread of execution is authorized to write message data.

The method of FIG. 6 also includes setting (504) by the outbox message controller the outbox read pointer. The outbox read pointer (476 on FIG. 4) may be implemented, for example, as a register in the outbox message controller (472 on FIG. 4) that stores the memory address of the location in the array where the outbox message controller is to read its next message data for transmission over the network from the outbox.

The method of FIG. 6 also includes providing (506), to the outbox message controller by the thread of execution, message control information, including destination identification and an indication that data in the array is ready to be sent. The message control information, such as destination address or message identification, and other control information such as 'ready to send,' may be written to registers in the outbox message controller (472 on FIG. 4) or such information may be written into the array (478 on FIG. 4) itself as part of the message data, in a message header, message meta-data, or the like.

The method of FIG. 6 also includes sending (508), by the outbox message controller to the network, message data written into the array by a thread of execution associated with the outbox. In the NOC upon which the method of FIG. 6 is implemented, each network interface controller (108 on FIG. 4) is enabled to convert communications instructions from command format to network packet format for transmission among the IP blocks (104 on FIG. 4) through routers (110 on FIG. 4). The communications instructions are formulated in command format by the associated thread of execution (458 on FIG. 4) in the IP block (104 on FIG. 4) and provided by the outbox message controller (472 on FIG. 4) to the network interface controller (108 on FIG. 4) in command format. The command format is a native format that conforms to architectural register files of the IP block (104 on FIG. 4) and the outbox message controller (472 on FIG. 4). The network packet format is the format required for transmission through routers (110 on FIG. 4) of the network. Each such message is composed of one or more network packets. Such communications instructions may include, for example, communications instructions that send messages among IP blocks carrying data and instructions for processing the data among IP blocks in parallel applications and in pipelined applications.

The method of FIG. 6 also includes setting (510) by the inbox message controller the inbox write pointer. The inbox write pointer (466 on FIG. 4) may be implemented, for example, as a register in the inbox message controller (454 on FIG. 4) that stores the memory address of the beginning location in the array (470 on FIG. 4) where message data from an outbox of another IP block is to be written.

The method of FIG. 6 also includes setting (512) by the inbox message controller the inbox read pointer. The inbox read pointer (468 on FIG. 4) may be implemented, for example, as a register in the inbox message controller (454 on FIG. 4) that stores the memory address of the beginning location in the array (470 on FIG. 4) where an associated thread of execution (456 on FIG. 4) may read the next message received from an outbox of some other IP block.

The method of FIG. 6 also includes receiving (514), by the inbox message controller from the network, message data written to the network from another outbox of another IP block, and providing (516), by the inbox message controller to a thread of execution associated with the inbox, the message data received from the network. The inbox message controller (454 on FIG. 4) is enabled to receive from the network message data written to the network from an outbox of another IP block and provide to a thread of execution (456 on FIG. 4) associated with the inbox (460 on FIG. 4) the message data received from the network. The inbox message controller of FIG. 4 receives from a network interface controller (108 on FIG. 4) message data from an outbox of some other IP block and writes the received message data to the array (470 on FIG. 4).

The method of FIG. 6 also includes notifying (518), by the inbox message controller the thread of execution associated with the inbox, that message data has been received from the network. Upon writing the received message data to the array, an inbox message controller (464 on FIG. 4) is also enabled to notify the thread of execution (456 on FIG. 4) associated with the inbox that message data has been received from the network by, for example, setting a data-ready flag in a status register of the inbox message controller (454 on FIG. 4). The associated thread of execution may, for example, 'sleep until flag' before a message load, or a load opcode can be configured to check a data-ready flag in the inbox message controller.

A NOC according to embodiments of the present invention may be optimized for graphics rendering. For further explanation, FIG. 7 sets forth a data flow diagram illustrating graphics rendering on a NOC according to embodiments of the present invention. As mentioned above, a network on chip ('NOC') for graphics rendering includes integrated processor ('IP') blocks, routers, memory communications controllers, and network interface controllers, each IP block adapted to a router through a memory communications controller and a network interface controller, each memory communications controller controlling communication between an IP block and memory, and each network interface controller controlling inter-IP block communications through routers. In such a NOC for graphics rendering, the IP blocks include at least one geometry processor (602), a plurality of scan converters (604), and a plurality of pixel processors (606).

Figure 7:
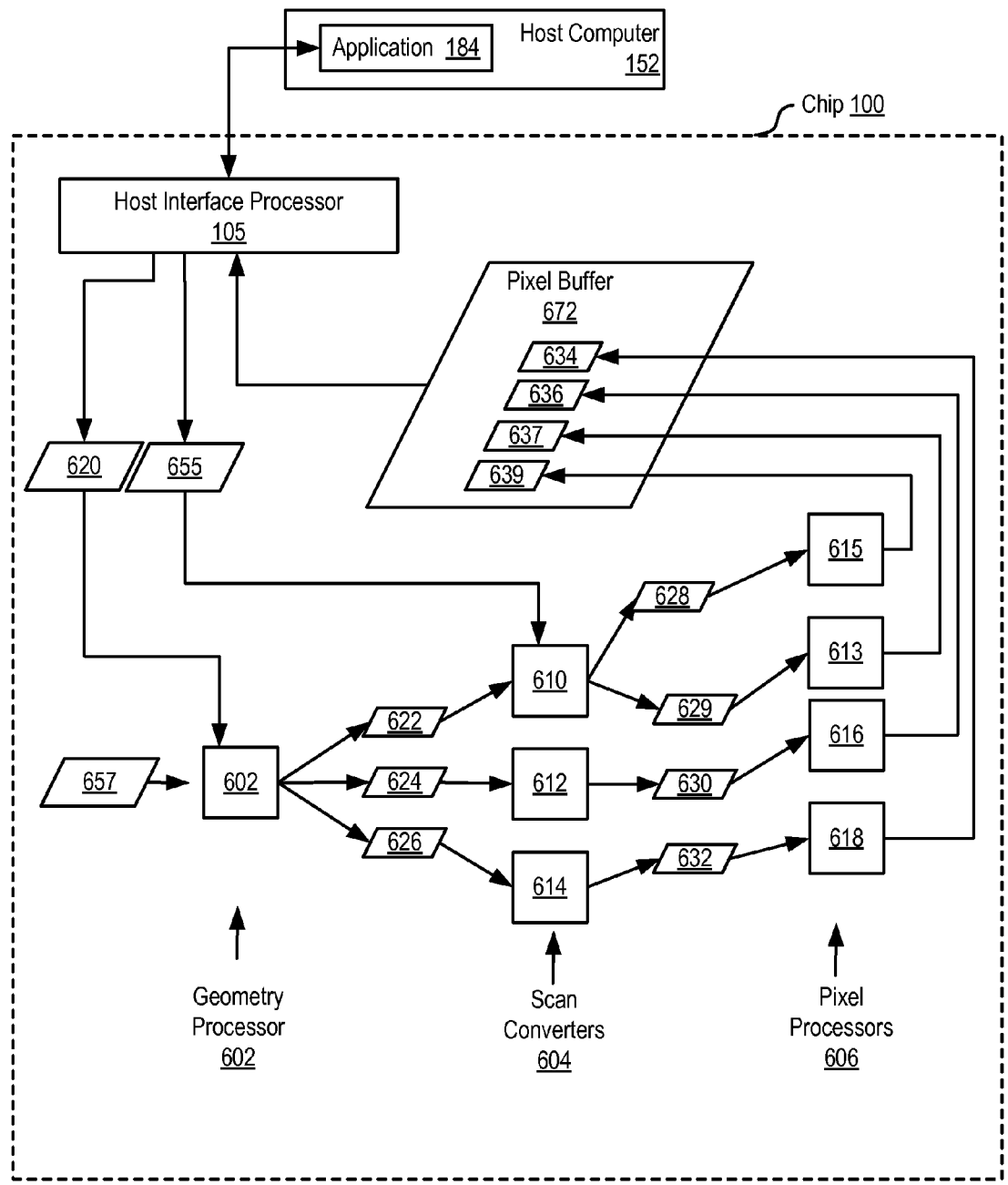
FIG. 7 sets forth a data flow diagram illustrating graphics rendering on a NOC according to embodiments of the present invention.

In the example of FIG. 7, the geometry processor (602) is configured to receive a representation (657) of an object to be rendered. The representation of the object (657) can be a two dimensional or three dimensional representation of the object. Such a representation may be implemented as a collection of vertices of geomantic primitives that representing an object to be rendered. Vertices represent the endpoints or control points of the geometric primitives that represent an object. Information included with such vertices typically include vertex x-y-z coordinates, RGB values, translucency, texture, reflectivity and other characteristics. Alternatively, the representation of the object received in the geometry processor may be an abstract description and vertices may be the generated by the geometry process from the abstract description. A representation of an object may be received from an IP block on-chip or from an off-chip source through the host interface processor.

The exemplary geometry processor of FIG. 7 configured to convert the representation of the object (657) to two dimensional primitives (622, 624, 626) and send the primitives (622, 624, 626) to the plurality (610, 612, 614) of scan converters (604). Examples of two dimensional primitives typically used in graphics rendering include lines and triangles.

The geometry processor (602) of FIG. 7 is configured to select a scan converter in dependence upon location approximation rules (620) and send the primitive to the selected scan converter. In the example of FIG. 7, the location approximation rules (620) are loaded into the geometry processor (602) by the host interface processor. The geometry processor (602) of FIG. 7 is further configured to select a single point in the primitive and compare the location of the single point with coordinates of portions of the image.

Each scan converter (610, 612, 614) is configured to convert the primitives to fragments, select, for each fragment in dependence upon sorting rules (655), a pixel processor to process the fragment; and send, to the selected pixel processors, the fragment. In the example of FIG. 7, the sorting rules (655) are loaded into the scan converters (610, 612, and 614) by the host interface processor (105). In the example of FIG. 7, each pixel processor (615, 613, 616, 618) is assigned to a portion of an image for processing fragments in that portion of the image. Each scan converter (610, 612, 614) is configured to select a pixel processor to process the fragment in dependence upon sorting rules is also configured to compare the locations of the pixel fragment with a set of image coordinates defining each portion of the image assigned to each pixel processor.

The example of FIG. 7 each scan converter is configured to compare the locations of the fragment with a set of display coordinates defining each portion of the image assigned to each pixel processor and is further configured to group the portions of the image into supersets of the image; and iteratively until a portion is found containing the fragment: compare the locations of the fragment with one of the supersets of the portions; if the fragment is in the superset, compare the locations of the fragment with the image coordinates of one or more of the portions of the superset; and if the fragment is not in the superset, select a next superset.

In the example of FIG. 7, scan converter (610) converts primitive (622) in to fragment (628) and selects pixel processor (615) to process the fragment. Scan converter (610) also converts primitive (622) in to fragment (629) and selects pixel processor (613) to process the fragment. Scan converter (612) converts primitive (624) in to fragment (630) and selects pixel processor (616) to process the fragment. Scan converter (614) also converts primitive (626) in to fragment (632) and selects pixel processor (618) to process the fragment.

Each pixel processor (615, 613, 616, 618) receiving the fragment (628, 629, 630, 632) is configured to process the fragment to produce pixels for an image. In the example of FIG. 7 pixel processor (615) processes fragment (628) to produce pixel (634) in pixel buffer (672). Pixel processor (613) processes fragment (629) to produce pixel (636) in pixel buffer (672). Pixel processor (616) processes fragment (630) to produce pixel (637) in pixel buffer (672). Pixel processor (618) processes fragment (632) to produce pixel (639) in pixel buffer (672). The image so rendered is the pixels in the pixel buffer (672) and may be provided off-chip through the host interface processor (105).

Figure 8:
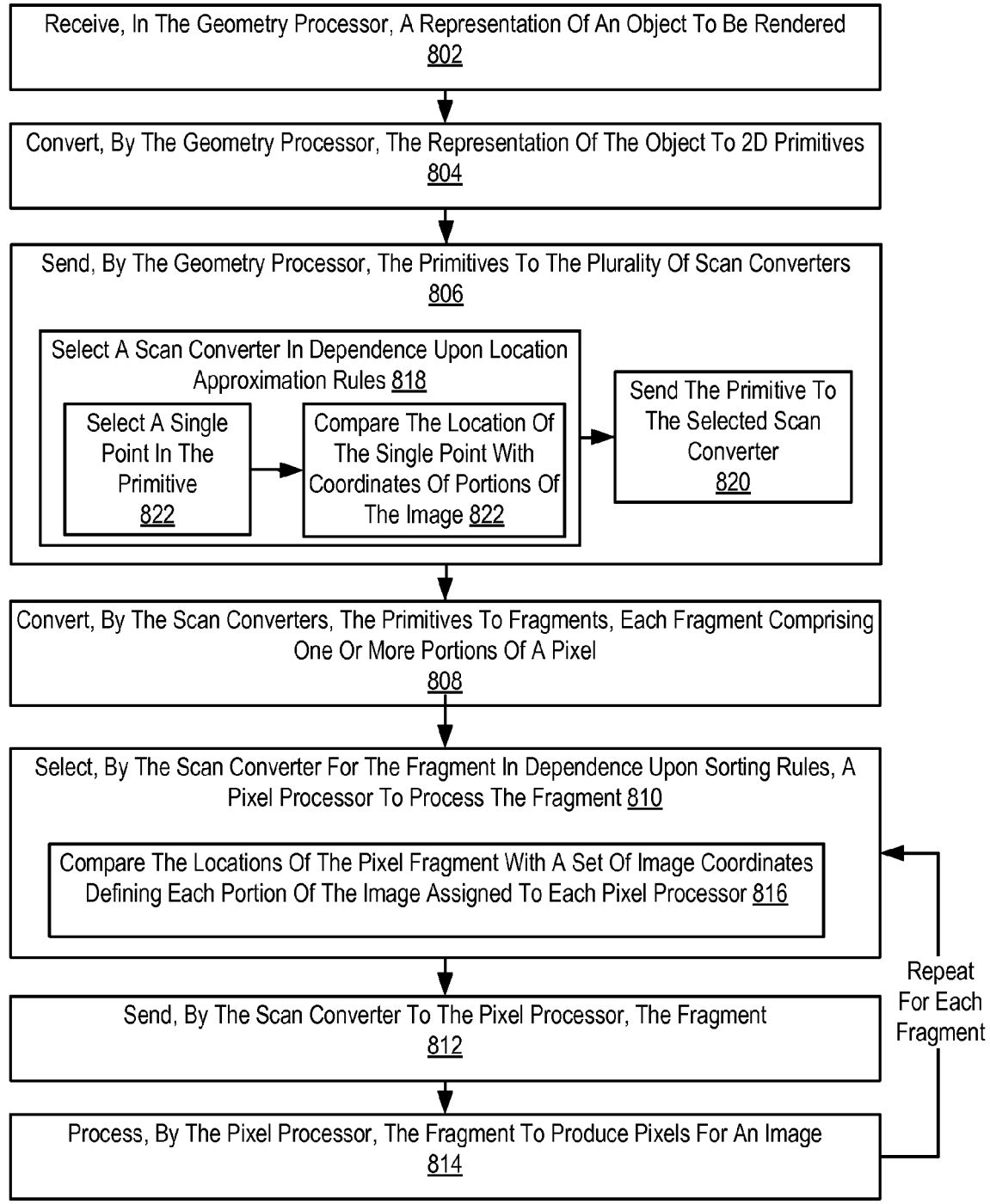
FIG. 8 sets forth a flow chart illustrating an exemplary method of graphics rendering on a network on chip ('NOC') according to the present invention.

For further explanation, FIG. 8 sets forth a flow chart illustrating an exemplary method of graphics rendering on a network on chip ('NOC'), the NOC comprising integrated processor ('IP') blocks, routers, memory communications controllers, and network interface controller, each IP block adapted to a router through a memory communications controller and a network interface controller, each memory communications controller controlling communication between an IP block and memory, and each network interface controller controlling inter-IP block communications through routers, the IP blocks comprising at least one geometry processor, a plurality of scan converters, and a plurality of pixel processors.

The method of FIG. 8 includes receiving (802), in the geometry processor, a representation of an object to be rendered. Receiving (802), in the geometry processor, a representation of an object to be rendered may be carried out by receiving the representation through an inbox of the IP block on which the geometry processor is running. Such a representation of an object may be received from an IP block on-chip or from an off-chip source through the host interface processor.

A representation of an object can be a two dimensional or three dimensional representation. Such a representation may be implemented as a collection of vertices of geomantic primitives that representing an object to be rendered. Vertices represent the endpoints or control points of the geometric primitives that represent an object. Information typically included with such vertices include vertex x-y-z coordinates, RGB values, translucency, texture, reflectivity and other characteristics. Alternatively, the representation of the object received in the geometry processor may be an abstract description and the vertices may be the generated by the geometry process from the abstract description.

The method of FIG. 8 includes converting (804), by the geometry processor, the representation of the object to two dimensional primitives. Examples of two dimensional primitives typically used in graphics rendering include lines and triangles.

The method of FIG. 8 includes sending (806), by the geometry processor, the primitives to the plurality of scan converters. Sending (806), by the geometry processor, the primitives to the plurality of scan converters may be carried out by sending the primitives through an outbox of the IP block on which the geometry processor is running.

Sending (806), by the one or more geometry processors, the primitives to the plurality of scan converters according to the method of FIG. 8 includes selecting (818) a scan converter in dependence upon location approximation rules and sending (820) the primitive to the selected scan converter. Location approximation rules are rules that approximate the location of the primitives in the image to be rendered such that the primitives may be sent to a scan converter assigned to a particular location of the image to be rendered. Such location approximation rules often serve to load balance network traffic by routing primitives to scan converters that will in turn frequently send the fragments to a subset of pixel processors.

Selecting (818) a scan converter in dependence upon location approximation rules according to the method of FIG. 8 includes selecting (822) a single point in the primitive and comparing (824) the location of the single point with coordinates of portions of the image. The selected single point may be anywhere in the primitive. Examples of convenient points in a primitive for use in selecting a scan converter in dependence upon location approximation rules include the center of the primitive or a vertex of the primitive.

The method of FIG. 8 includes converting (808), by the scan converters, the primitives to fragments, each fragment comprising one or more portions of a pixel. A fragment includes the data necessary to produce a pixel in a frame buffer. Such information may include a raster position, depth, pixel color, texture coordinates, and many others. A fragment typically includes the data needed to shade the pixel and the data needed to test whether the fragment is to be processed to produce a pixel For each fragment, the method of FIG. 8 includes:
 selecting (810), by the scan converter for the fragment in dependence upon sorting rules, a pixel processor to process the fragment;
 sending (812), by the scan converter to the pixel processor, the fragment; and
 processing (814), by the pixel processor, the fragment to produce pixels for an image.

Sorting rules for selecting (810) a pixel processor to process the fragment are rules designed to select a pixel processor an appropriate pixel processor for processing the fragment. In the example of FIG. 8, each pixel processor is assigned to a portion of an image for processing fragments in that portion of the image. Selecting (810), by the scan converter for the pixel fragment, a pixel processor to process the fragment in dependence upon sorting rules in the example of FIG. 8 therefore includes comparing (816) the locations of the pixel fragment with a set of image coordinates defining each portion of the image assigned to each pixel processor as discussed below with reference to FIG. 9. Such sorting rules for selecting a pixel processor may be static or variable, even changing from frame to frame.

Sending (812), by the scan converter to the pixel processor, the fragment may be carried out by includes sending the fragment through an outbox of the IP block on which the scan converter is running to an inbox of the IP block on which the pixel processor is running. The fragment may be encapsulated in a packet and sent to the prixel processor. Alternatively, a pointer to the data of the fragment may be include in a packet.

Processing (814), by the pixel processor, the fragment produces pixels for an image. A collection of pixels, typically maintained in a pixel, buffer represents the image to be displayed. The contents of such a pixel buffer may then be processed to produce the rendered image.

As mentioned above, graphics rendering on a NOC according to the method of FIG. 8 includes comparing (816) the locations of the fragment with a set of image coordinates defining each portion of the image assigned to each pixel processor. For further explanation, FIG. 9 sets forth an exemplary method for comparing the locations of the fragment with a set of image coordinates defining each portion of the image assigned to each pixel processor. The method of FIG. 9 includes grouping (902) the portions of the image into supersets of the image. Supersets of the image represent larger portions of the image that are assigned to more than one pixel processor. Grouping (902) the portions of the image into supersets of the image groups potential pixel processors for processing the fragment categories according to their location. Such supersets are used to more efficiently identify pixel processors which are not candidates for processing the fragment and identify a subset of all the pixel processors containing a pixel processor that is a candidate for processing the fragment.

Figure 9:
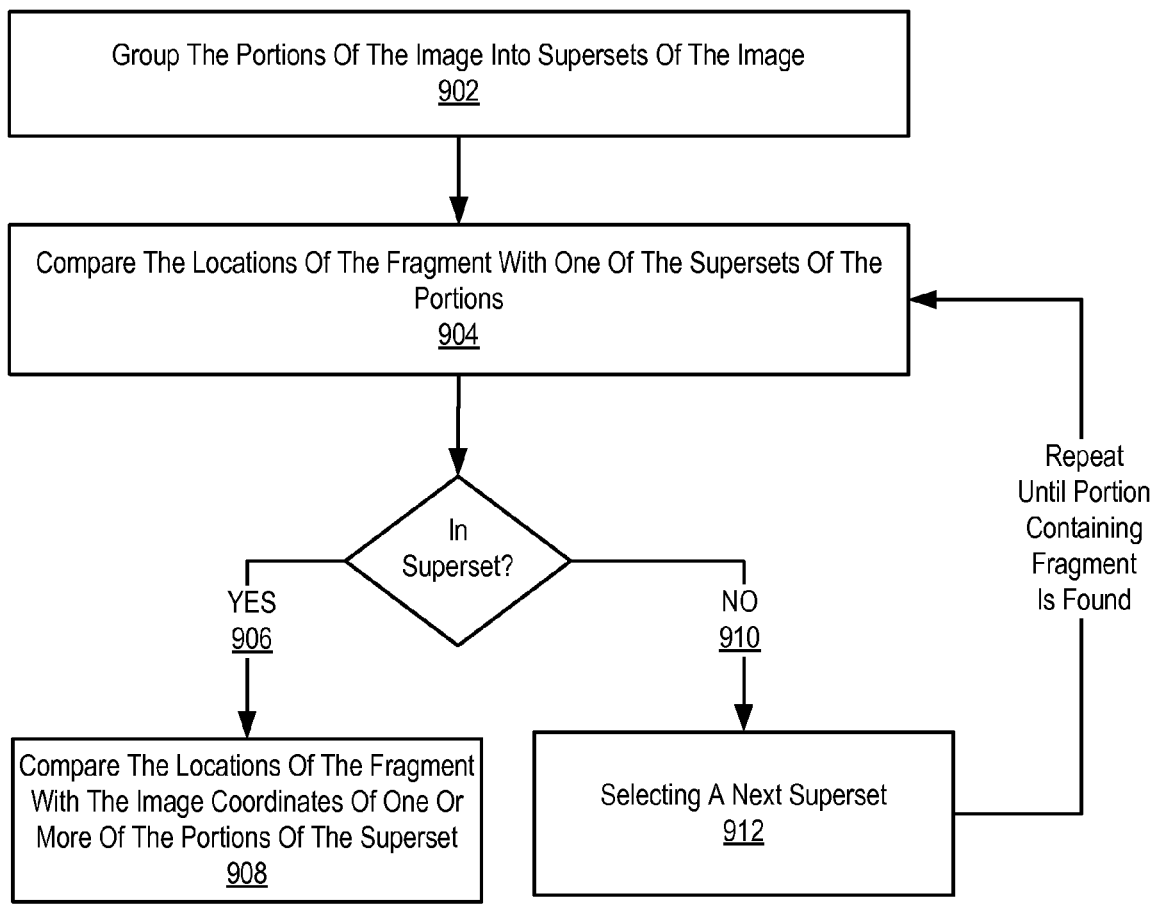
FIG. 9 sets forth an exemplary method for comparing the locations of the fragment with a set of image coordinates defining each portion of the image assigned to each pixel processor.

The method of FIG. 9 includes, iteratively until a portion is found containing the fragment, comparing (904) the locations of the fragment with one of the supersets of the portions and if the fragment is in the superset (906), comparing (908) the locations of the fragment with the image coordinates of one or more of the portions of the superset. Comparing (908) the locations of the fragment with the image coordinates of one or more of the portions of the superset is carried out until a portion of the image is found that corresponds the location of the fragment. The fragment is then sent to the pixel processor assigned to process fragments for that portion of the image. If the fragment is not in the superset (910), the method of FIG. 8 includes selecting a next superset (912).

Exemplary embodiments of the present invention are described largely in the context of a fully functional computer system for graphics rendering on a NOC. Readers of skill in the art will recognize, however, that the present invention also may be embodied in a computer program product disposed on computer readable media for use with any suitable data processing system. Such computer readable media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets™ and networks that communicate with the Internet Protocol and the World Wide Web as well as wireless transmission media such as, for example, networks implemented according to the IEEE 802.11 family of specifications. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of graphics rendering on a network on chip ('NOC'), the NOC comprising integrated processor ('IP') blocks, routers, memory communications controllers, and network interface controller, each IP block adapted to a router through a memory communications controller and a network interface controller, each memory communications controller controlling communication between an IP block and memory, and each network interface controller controlling inter-IP block communications through routers,
the IP blocks comprising at least one geometry processor, a plurality of scan converters, and a plurality of pixel processors;
the method comprising:
receiving, in the geometry processor, a representation of an object to be rendered;
converting, by the geometry processor, the representation of the object to two dimensional primitives;
sending, by the geometry processor, the primitives to the plurality of scan converters;
converting, by the scan converters, the primitives to fragments, each fragment comprising one or more portions of a pixel;
for each fragment:
selecting, by the scan converter for the fragment in dependence upon sorting rules, a pixel processor to process the fragment;
sending, by the scan converter to the pixel processor, the fragment; and
processing, by the pixel processor, the fragment to produce pixels for an image.

2. The method claim 1 wherein each pixel processor is assigned to a portion of an image for processing fragments in that portion of the image; and
selecting, by the scan converter for the pixel fragment, a pixel processor to process the fragment in dependence upon sorting rules further comprises comparing the locations of the pixel fragment with a set of image coordinates defining each portion of the image assigned to each pixel processor.

3. The method claim 2 wherein comparing the locations of the fragment with a set of display coordinates defining each portion of the image assigned to each pixel processor further comprises:

grouping the portions of the image into supersets of the image; and
iteratively until a portion is found containing the fragment:
comparing the locations of the fragment with one of the supersets of the portions;
if the fragment is in the superset, comparing the locations of the fragment with the image coordinates of one or more of the portions of the superset; and
if the fragment is not in the superset, selecting a next superset.

4. The method of claim 1 wherein sending, by the one or more geometry processors, the primitives to the plurality of scan converters further comprises:
selecting a scan converter in dependence upon location approximation rules; and
sending the primitive to the selected scan converter.

5. The method of claim 4 wherein selecting a scan converter in dependence upon location approximation rules; further comprises:
selecting a single point in the primitive; and
comparing the location of the single point with coordinates of portions of the image.

6. The method of claim 1 wherein:
each IP block also includes an inbox and an outbox; and
each IP block is adapted to the network by a low latency, high bandwidth application messaging interconnect comprising an inbox and an outbox; and
wherein:
receiving, in the geometry processor, a representation of an object to be rendered includes receiving the representation through an inbox of the IP block on which the geometry processor is running;
sending, by the geometry processor, the primitives to the plurality of scan converters includes sending the primitives through an outbox of the IP block on which the geometry processor is running; and
sending, by the scan converter to the pixel processor, the fragment includes sending the fragment through an outbox of the IP block on which the scan converter is running to an inbox of the IP block on which the pixel processor is running.

7. A network on chip ('NOC') for graphics rendering, the NOC comprising integrated processor ('IP') blocks, routers, memory communications controllers, and network interface controllers, each IP block adapted to a router through a memory communications controller and a network interface controller, each memory communications controller controlling communication between an IP block and memory, and each network interface controller controlling inter-IP block communications through routers, the IP blocks comprising at least one geometry processor, a plurality of scan converters, and a plurality of pixel processors;
at least one geometry processor configured to receive a representation of an object to be rendered
the geometry processor configured to convert the representation of the object to two dimensional primitives;
the geometry processor configured to send the primitives to the plurality of scan converters;
each scan converter configured to convert the primitives to fragments, each fragment comprising one or more portions of a pixel;
each scan converter configured to select, for each fragment in dependence upon sorting rules, a pixel processor to process the fragment;
each scan converter configured to send, to at least one of the pixel processors, the fragment; and each pixel processor receiving the fragment configured to process the fragment to produce pixels for an image.

8. The NOC of claim 7 wherein a plurality of pixel processor are assigned to a portion of an image for processing fragments in that portion of the image; and
each scan converter configured to select a pixel processor to process the fragment in dependence upon sorting rules is configured to compare the locations of the pixel fragment with a set of image coordinates defining each portion of the image assigned to each pixel processor.

9. The NOC claim 8 wherein each scan converter configured to compare the locations of the fragment with a set of display coordinates defining each portion of the image assigned to each pixel processor is further configured to:
group the portions of the image into supersets of the image; and
iteratively until a portion is found containing the fragment:
compare the locations of the fragment with one of the supersets of the portions;
if the fragment is in the superset, compare the locations of the fragment with the image coordinates of one or more of the portions of the superset; and
if the fragment is not in the superset, select a next superset.

10. The NOC of claim 7 wherein each geometry processor configured to send the primitives to the plurality of scan converters is further configured to:
select a scan converter in dependence upon location approximation rules; and
send the primitive to the selected scan converter.

11. The NOC of claim 10 wherein each geometry processor configured to select a scan converter in dependence upon location approximation rules is further configured to:
select a single point in the primitive; and
compare the location of the single point with coordinates of portions of the image.

12. The NOC of claim 7 wherein:
each IP block also includes an inbox and an outbox; and
each IP block is adapted to the network by a low latency, high bandwidth application messaging interconnect comprising an inbox and an outbox; and
wherein:
the geometry processor is configured to receive the representation through an inbox of the IP block on which the geometry processor is running;
the geometry processor is configured to send primitives to the plurality of scan converters through an outbox of the IP block on which the geometry processor is running; and
the scan converters are configured to send the fragments through an outbox of the IP block on which the scan converter is running to an inbox of the IP block on which the pixel processor is running.

13. A computer program product for graphics rendering on a network on chip ('NOC'), the NOC comprising integrated processor ('IP') blocks, routers, memory communications controllers, and network interface controller, each IP block adapted to a router through a memory communications controller and a network interface controller, each memory communications controller controlling communication between an IP block and memory, and each network interface controller controlling inter-IP block communications through routers, the IP blocks comprising at least one geometry processor, a plurality of scan converters, and a plurality of pixel processors;
the computer program product embodied on a computer-readable signal bearing medium, the computer program product comprising computer program instructions for:
receiving, in the geometry processor, a representation of an object to be rendered;
converting, by the geometry processor, the representation of the object to two dimensional primitives;
sending, by the geometry processor, the primitives to the plurality of scan converters;
converting, by the scan converters, the primitives to fragments, each fragment comprising one or more portions of a pixel;
for each fragment:
selecting, by the scan converter for the fragment in dependence upon sorting rules, a pixel processor to process the fragment;
sending, by the scan converter to the pixel processor, the fragment; and
processing, by the pixel processor, the fragment to produce pixels for an image.

14. The computer program product claim 13 wherein each pixel processor is assigned to a portion of an image for processing fragments in that portion of the image; and
computer program instructions for selecting, by the scan converter for the pixel fragment, a pixel processor to process the fragment in dependence upon sorting rules further comprise computer program instructions for comparing the locations of the pixel fragment with a set of image coordinates defining each portion of the image assigned to each pixel processor.

15. The computer program product claim 14 wherein computer program instructions for comparing the locations of the fragment with a set of display coordinates defining each portion of the image assigned to each pixel processor further comprise computer program instructions for:
grouping the portions of the image into supersets of the image; and
iteratively until a portion is found containing the fragment:
comparing the locations of the fragment with one of the supersets of the portions;
if the fragment is in the superset, comparing the locations of the fragment with the image coordinates of one or more of the portions of the superset; and
if the fragment is not in the superset, selecting a next superset.

16. The computer program product of claim 13 wherein computer program instructions for sending, by the one or more geometry processors, the primitives to the plurality of scan converters further comprise computer program instructions for:
selecting a scan converter in dependence upon location approximation rules; and
sending the primitive to the selected scan converter.

17. The computer program product of claim 16 wherein computer program instructions for selecting a scan converter in dependence upon location approximation rules; further comprise computer program instructions for:
selecting a single point in the primitive; and
comparing the location of the single point with coordinates of portions of the image.

18. The computer program product of claim 13 wherein:
each IP block also includes an inbox and an outbox; and
each IP block is adapted to the network by a low latency, high bandwidth application messaging interconnect comprising an inbox and an outbox; and
wherein:
computer program instructions for receiving, in the geometry processor, a representation of an object to be rendered includes computer program instructions for receiving the representation through an inbox of the IP block on which the geometry processor is running;

computer program instructions for sending, by the geometry processor, the primitives to the plurality of scan converters includes computer program instructions for sending the primitives through an outbox of the IP block on which the geometry processor is running; and computer program instructions for sending, by the scan converter to the pixel processor, the fragment includes computer program instructions for sending the fragment through an outbox of the IP block on which the scan converter is running to an inbox of the IP block on which the pixel processor is running.

19. The computer program product of claim 13 wherein the computer-readable signal bearing medium comprises a recording medium.

20. The computer program product of claim 13 wherein the computer-readable signal bearing medium comprises a transmission medium.

* * * * *